United States Patent
Yun et al.

(10) Patent No.: US 11,411,788 B2
(45) Date of Patent: Aug. 9, 2022

(54) METHOD AND DEVICE FOR GENERATING TRAINING SIGNAL IN WIRELESS LAN SYSTEM

(71) Applicant: LG ELECTRONICS INC., Seoul (KR)

(72) Inventors: Sunwoong Yun, Seoul (KR); Jinmin Kim, Seoul (KR); Eunsung Park, Seoul (KR); Dongguk Lim, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/733,876

(22) PCT Filed: May 31, 2019

(86) PCT No.: PCT/KR2019/006612
§ 371 (c)(1),
(2) Date: Nov. 30, 2020

(87) PCT Pub. No.: WO2019/231293
PCT Pub. Date: Dec. 5, 2019

(65) Prior Publication Data
US 2021/0218609 A1 Jul. 15, 2021

(30) Foreign Application Priority Data

Jun. 1, 2018 (KR) .................. 10-2018-0063535
Feb. 22, 2019 (KR) .................. 10-2019-0021391
Feb. 22, 2019 (KR) .................. 10-2019-0021394

(51) Int. Cl.
*H04L 27/26* (2006.01)
*H04W 84/12* (2009.01)

(52) U.S. Cl.
CPC .... *H04L 27/2605* (2013.01); *H04L 27/26025* (2021.01); *H04W 84/12* (2013.01)

(58) Field of Classification Search
CPC ........... H04L 27/2605; H04L 27/26025; H04L 25/0224; H04L 5/0023; H04W 84/12
See application file for complete search history.

(56) References Cited

U.S. PATENT DOCUMENTS

2016/0066321 A1* 3/2016 Yu ........................... H04L 27/18
370/329
2016/0204960 A1* 7/2016 Yu ........................ H04L 25/0224
370/338

(Continued)

FOREIGN PATENT DOCUMENTS

WO 2016125999 8/2016

OTHER PUBLICATIONS

PCT International Application No. PCT/KR2019/006612, International Search Report dated Sep. 3, 2019, 4 pages.

(Continued)

*Primary Examiner* — Mohammad S Anwar
(74) *Attorney, Agent, or Firm* — Lee Hong Degerman Kang Waimey

(57) ABSTRACT

This specification is related to a long training field (LTF) symbol of a WLAN. The LTF symbol may be generated based on a first LTF generation sequence used for an odd-numbered stream and a second LTF generation sequence used for an even-numbered stream. An even-numbered element of the first LTF generation sequence may be set to zero (0), and an odd-numbered element of the second LTF generation sequence may be set to zero (0). A plurality of LTF symbols for first and third streams may be generated by applying a P mapping matrix to the first LTF generation sequence. A plurality of LTF symbols for a (Continued)

second stream may be generated by applying the P matrix to the second LTF generation sequence.

8 Claims, 14 Drawing Sheets

(56)  References Cited

U.S. PATENT DOCUMENTS

2017/0026952 A1   1/2017  Park et al.
2018/0011179 A1   1/2018  Zhang et al.

OTHER PUBLICATIONS

Li, Q. et al., "HE-LTF Sequence for UL MU-MIMO", doc.: IEEE 802.11-15/0602r6, Sep. 2015, 35 pages.
Gan, M. et al., "HE-LTF -26.3.10.3", IEEE P802.11 Wireless LANs, doc.: IEEE 802.11-16/1202r5, Sep. 2016, 19 pages.

* cited by examiner

FIG. 1
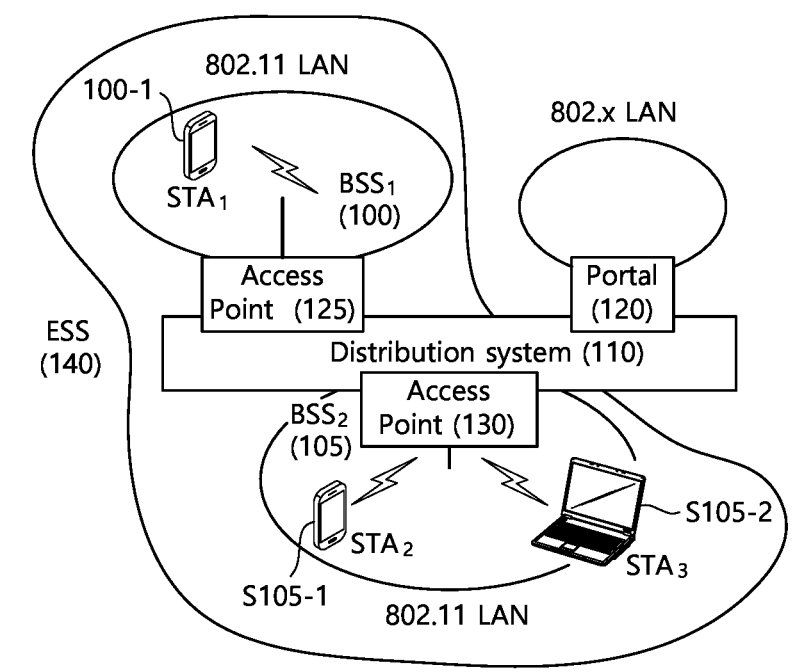
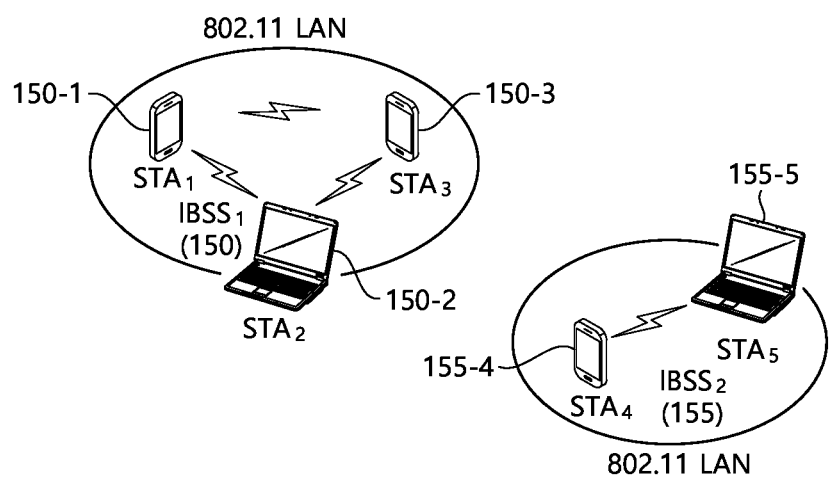

FIG. 9

$$\text{LTF generation sequence(LTF}_k\text{)} \quad \times \quad \begin{bmatrix} A_{11} & A_{12} \\ A_{21} & A_{22} \end{bmatrix}$$

$$= \begin{bmatrix} A_{11} \cdot LTF_k & A_{12} \cdot LTF_k \\ A_{21} \cdot LTF_k & A_{22} \cdot LTF_k \end{bmatrix} \begin{matrix} \sim 910 \\ \\ \sim 920 \end{matrix}$$

$$\underbrace{\phantom{A_{11} \cdot LTF_k}}_{930} \underbrace{\phantom{A_{12} \cdot LTF_k}}_{940} \longrightarrow \text{Time}$$

↓ Spatial stream

FIG. 12

| Legacy Part (1210) | EHT SIG Part (1220) | EHT STF Part (1230) | EHT LTF Part (1240) | Data (1250) |

METHOD AND DEVICE FOR GENERATING TRAINING SIGNAL IN WIRELESS LAN SYSTEM

CROSS-REFERENCE TO RELATED APPLICATIONS

This application is the National Stage filing under 35 U.S.C. 371 of International Application No. PCT/KR2019/006612, filed on May 31, 2019, which claims the benefit of earlier filing date and right of priority to Korean Patent Application Nos. 10-2018-0063535, filed on Jun. 1, 2018, 10-2019-0021391, filed on Feb. 22, 2019, and 10-2019-0021394, filed on Feb. 22, 2019, the contents of which are all incorporated by reference herein in their entirety.

BACKGROUND OF THE DISCLOSURE

Field of the Disclosure

This specification relates to a method and apparatus for generating a training signal in a WLAN system and is more particularly related to a method and apparatus related to a training field for channel estimation.

Related Art

A wireless local area network (WLAN) has been improved in various manners. For example, the IEEE 802.11ax standard proposed an improved communication environment using orthogonal frequency division multiple access (OFDMA) and downlink multi-user multiple input, multiple output (DL MU MIMO) schemes.

This specification proposes a technical characteristic which improves the existing IEEE 802.11ax standard or which may be used in a new communication standard. The new communication standard may be an extreme high throughput (EHT) standard which is recently discussed. The EHT standard may use a newly proposed enhanced bandwidth, an enhanced PPDU structure, an enhanced sequence, a hybrid automatic repeat request (HARQ) scheme, etc.

Meanwhile, in a conventional IEEE standard, an LTF supporting only a limited number of streams (i.e., space-time stream; STS) was proposed. For example, the conventional IEEE 802.11ax standard supported only a maximum of 8 streams. However, in the EHT standard, an increased number of streams may be used compared to conventional technology.

SUMMARY

This specification proposes a method and apparatus for generating an LTF supporting an increased number of streams. For example, a conventional LTF generation scheme supported only a limited number of streams. Furthermore, in the conventional LTF generation scheme, the number of LTF symbols was greatly increased as streams are increased. An example of this specification proposes an enhanced LTF generation scheme compared to conventional technology.

An example according to this specification is related to a method and/or an apparatus for a wireless local area network (WLAN) system.

A method according to an example of this specification may generate a plurality of long training field (LTF) symbols used for a plurality of streams including first to third streams.

In this case, each of the plurality of LTF symbols may be generated based on a first LTF generation sequence used for an odd-numbered stream and a second LTF generation sequence used for an even-numbered stream. An even-numbered element of the first LTF generation sequence may be set to zero (0), and an odd-numbered element of the second LTF generation sequence may be set to zero (0). A plurality of LTF symbols for the first and third streams may be generated by applying a P mapping matrix to the first LTF generation sequence, and a plurality of LTF symbols for the second stream may be generated by applying the P matrix to the second LTF generation sequence.

An example according to this specification proposes a generation scheme of an LTF supporting an increased number (e.g., a maximum of 16) of streams. Additionally or alternatively, an example according to this specification proposes a scheme for generating an increased number of streams using a small number of LTF symbols compared to conventional technology.

BRIEF DESCRIPTION OF THE DRAWINGS

FIG. 1 is a conceptual diagram illustrating a structure of a WLAN.

FIG. 9 is an example in which a P matrix is applied to an LTF sequence.

FIG. 12 is an example of a PPDU structure including an LTF signal of this specification.

DESCRIPTION OF EXEMPLARY EMBODIMENTS

Figure 2:
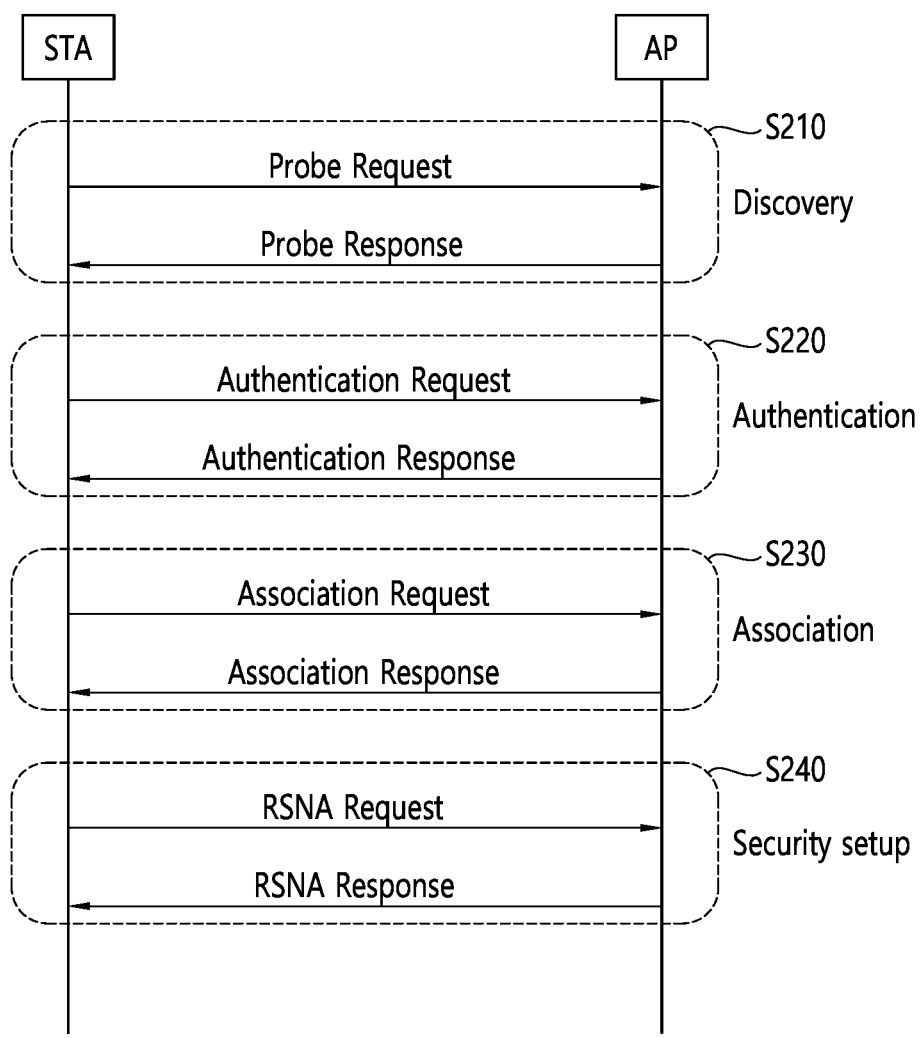
FIG. 2 is a diagram describing a common link setup process.

As used herein, a slash (/) or comma may indicate "and/or". For example, "A/B" may indicate "A and/or B," and therefore may mean "only A", "only B", or "A and B". Technical features that are separately described in one drawing may be implemented separately or may be implemented simultaneously.

As used herein, parentheses may indicate "for example". Specifically, "control information (EHT-SIG)" may mean that "EHT-SIG" is proposed as an example of "control information". Further, "control information (i.e., EHT-SIG)" may also mean that "EHT-SIG" is proposed as an example of "control information".

The following examples of the present specification may be applied to various wireless communication systems. For example, the following examples of the present specification may be applied to a wireless local area network (WLAN) system. For example, the present specification may be applied to IEEE 802.11a/g/n/ac or IEEE 802.1 lax. The present specification may also be applied to a newly proposed EHT standard or IEEE 802.11be.

Hereinafter, technical features of a WLAN system to which the present specification is applicable are described in order to describe technical features of the present specification.

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

FIG. 2 illustrates a general link setup process.

In S210, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 2 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 2, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information about a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S220. The authentication process may be referred to as a first authentication process to be clearly distinguished from the following security setup operation in S240. The authentication process in S220 may include a process in which the STA transmits an authentication request frame to the AP and the AP transmits an authentication response frame to the STA in response. The authentication frames used for an authentication request/response are management frames.

The authentication frames may include information about an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S230. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S240, the STA may perform a security setup process. The security setup process in S240 may include a process of setting up a private key through four-way handshaking, for example, through an extensible authentication protocol over LAN (EAPOL) frame.

Figure 3:
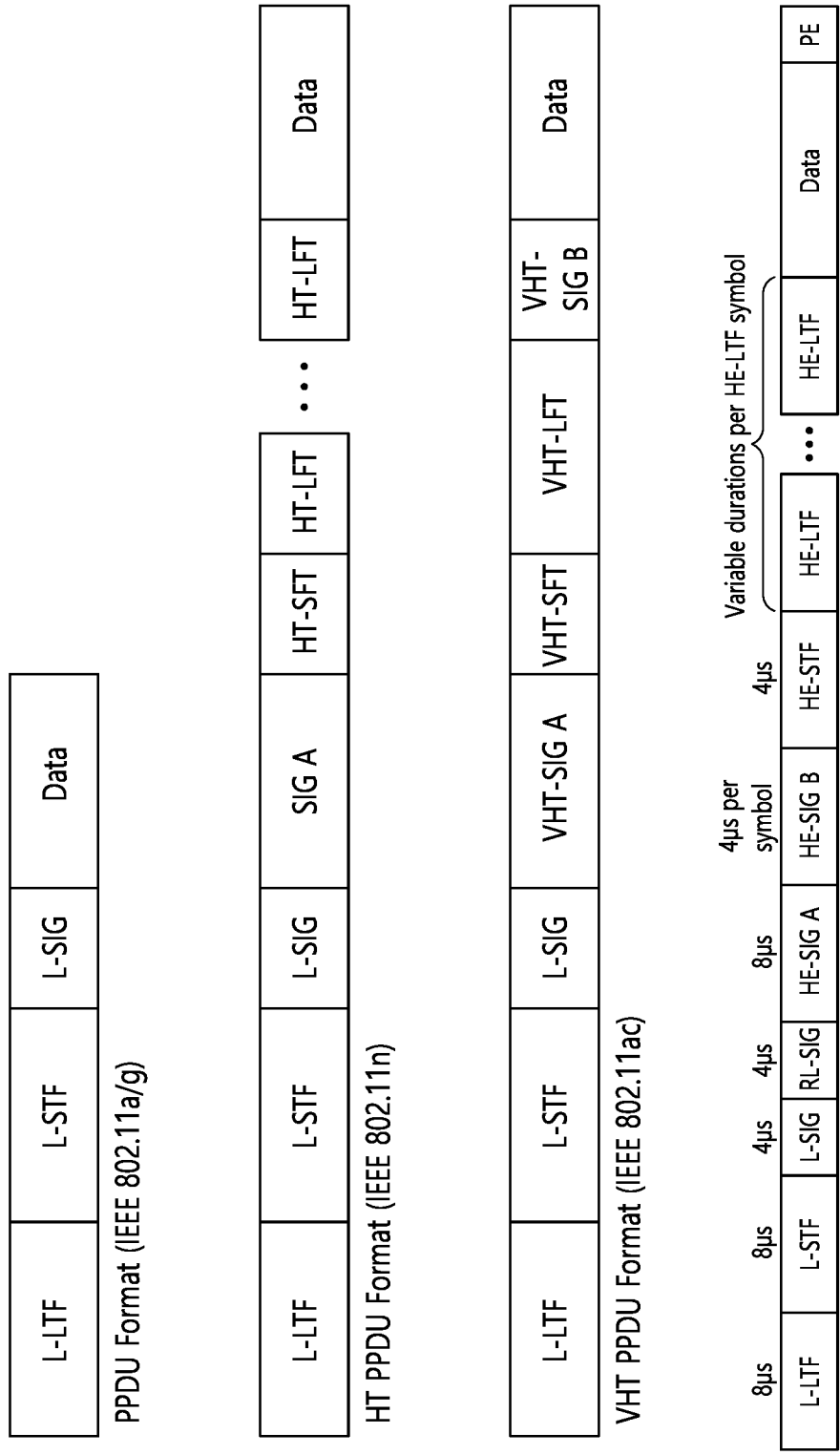
FIG. 3 is a diagram illustrating an example of a PPDU used in the IEEE standard.

FIG. 3 illustrates an example of a PPDU used in an IEEE standard.

As illustrated in FIG. 3, various types of PHY protocol data units (PPDUs) are used in IEEE a/g/n/ac standards. Specifically, a LTF and a STF include a training signal, a SIG-A and a SIG-B include control information for a receiving STA, and a data field includes user data corresponding to a PSDU (MAC PDU/aggregated MAC PDU).

FIG. 3 also includes an example of an HE PPDU according to IEEE 802.11ax. The HE PPDU according to FIG. 3 is an illustrative PPDU for multiple users. An HE-SIG-B may be included only in a PPDU for multiple users, and an HE-SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 4:
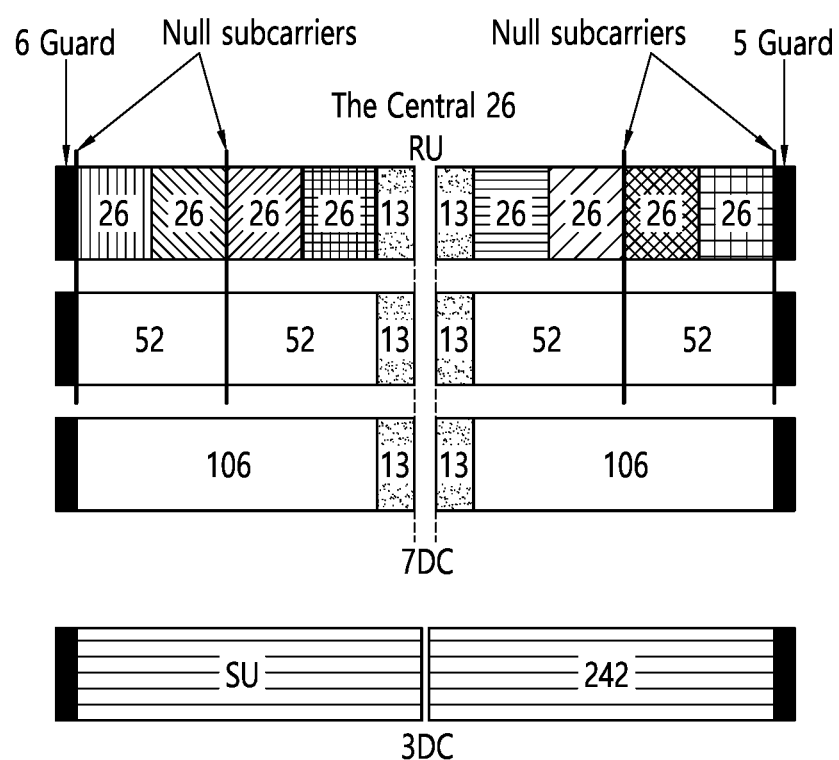
FIG. 4 is a diagram illustrating the arrangement of resource units (RU) used in a 20 MHz band.

FIG. 4 illustrates a layout of resource units (RUs) used in a band of 20 MHz.

As illustrated in FIG. 4, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 4, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 4 may be used not only for a multiple users (MUs) but also for a single user (SU), in which case one 242-unit may be used and three DC tones may be inserted as illustrated in the lowermost part of FIG. 4.

Although FIG. 4 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 5:
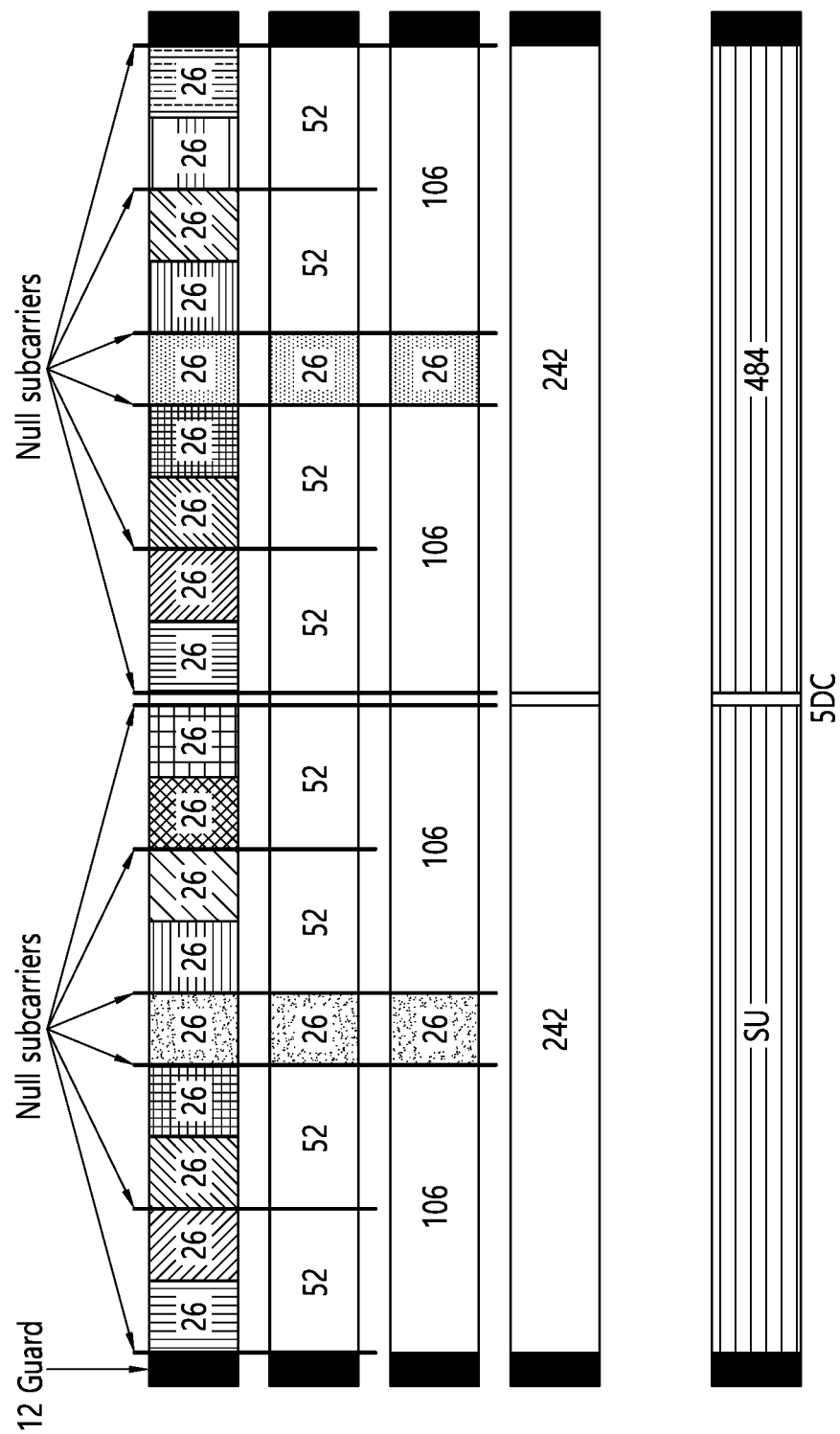
FIG. 5 is a diagram illustrating the arrangement of resource units (RU) used in a 40 MHz band.

FIG. 5 illustrates a layout of RUs used in a band of 40 MHz.

Similarly to FIG. 4 in which RUs having various sizes are used, a 26-RU, a 52-RU, a 106-RU, a 242-RU, a 484-RU, and the like may be used in an example of FIG. 5. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 5, when the layout of the RUs is used for a single user, a 484-RU may be used. The specific number of RUs may be changed similarly to FIG. 4.

Figure 6:
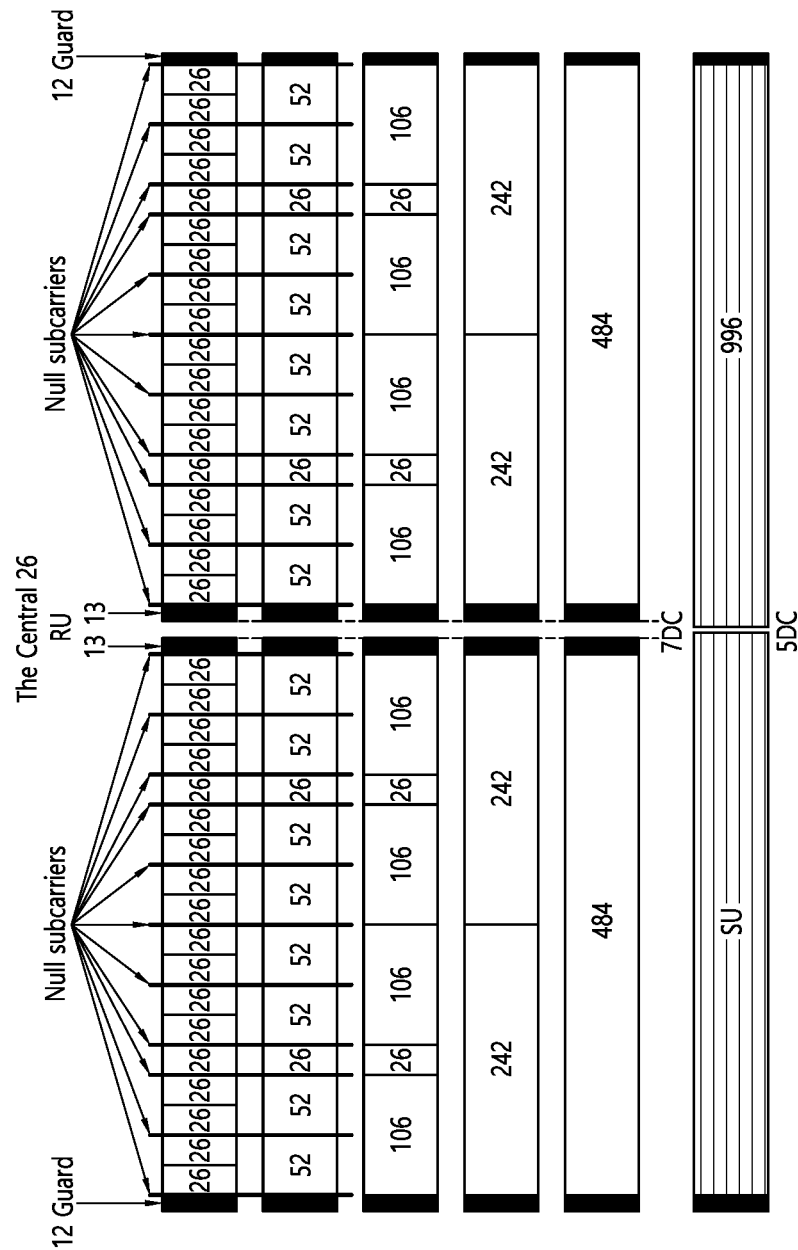
FIG. 6 is a diagram illustrating the arrangement of resource units (RU) used in an 80 MHz band.

FIG. 6 illustrates a layout of RUs used in a band of 80 MHz.

Similarly to FIG. 4 and FIG. 5 in which RUs having various sizes are used, a 26-RU, a 52-RU, a 106-RU, a 242-RU, a 484-RU, a 996-RU, and the like may be used in an example of FIG. 6. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 6, when the layout of the RUs is used for a single user, a 996-RU may be used, in which case five DC tones may be inserted.

The specific number of RUs may be changed similarly to FIG. 4 and FIG. 5.

Figure 7:
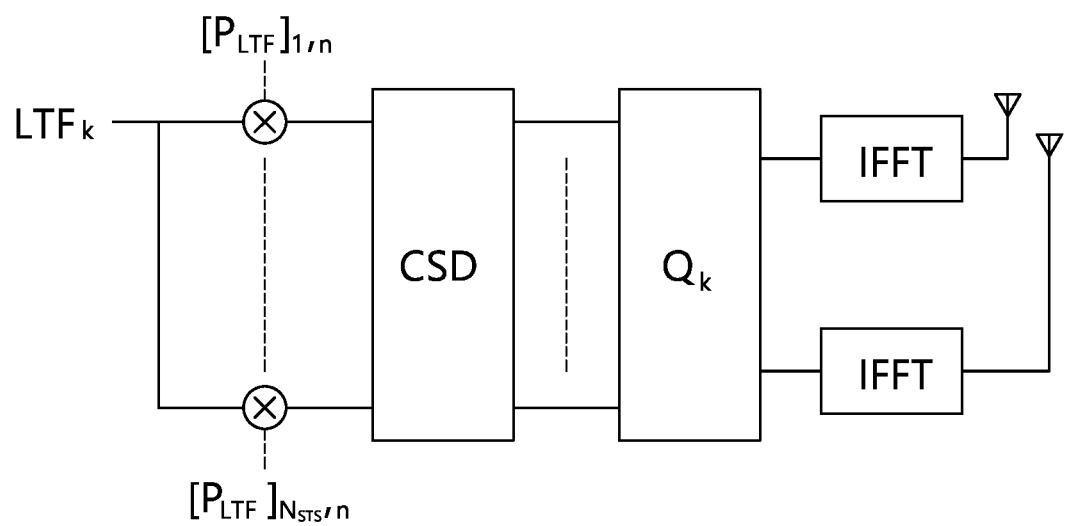
FIG. 7 describes a scheme for generating an LTF signal according to conventional technology.

FIG. 7 describes a scheme for generating an LTF signal according to conventional technology.

An example of FIG. 7 is based on a high throughput (HT) system, that is, an IEEE 802.11n system, but the example of FIG. 7 may be identically applied to VHT/HE/EHT (i.e., IEEE 802.11ac/ax/be) systems. Furthermore, the example of FIG. 7 is also identically applied to next-generation WIFI standards having various names. Accordingly, an example of this specification is not limited to a name called EHT.

The LTF signal of FIG. 7 includes a plurality of LTF symbols. The plurality of LTF symbols is generated based on an LTF generation sequence. The LTF generation sequence may be represented as $LTF_k$ (or LTF_k). An LTF generation sequence ($LTF_k$) may be multiplied by an LTF mapping matrix $P_{LTF}$ by a transmission STA. The LTF mapping matrix may be called an orthogonal matrix because it may include rows orthogonal to each other, and may be simply called a P matrix or a mapping matrix.

The orthogonal matrix $P_{LTF}$ may be applied to an LTF generation sequence. "Application" may mean a mathematical multiplication. The LTF generation sequence to which the P matrix has been applied has orthogonality with respect to each stream, and thus may be used for channel estimation (i.e., channel estimation for a MIMO channel) in a reception STA.

A cyclic shift delay (CSD) process for preventing unwanted beamforming is applied to the LTF generation sequence to which the P matrix has been applied. The LTF generation sequence may be mapped to a transmission antenna by an antenna mapping matrix $Q_k$ for k subcarriers. $Q_k$ functions to map a space-time stream (STS) and a transmit chain. An LTF generation sequence mapped to each transmit chain may be transmitted through the transmission antenna via inverse fast Fourier transform (IFFT) or IDFT. In this specification, an IFFT operation may be substituted with an IDFT operation.

Figure 8:
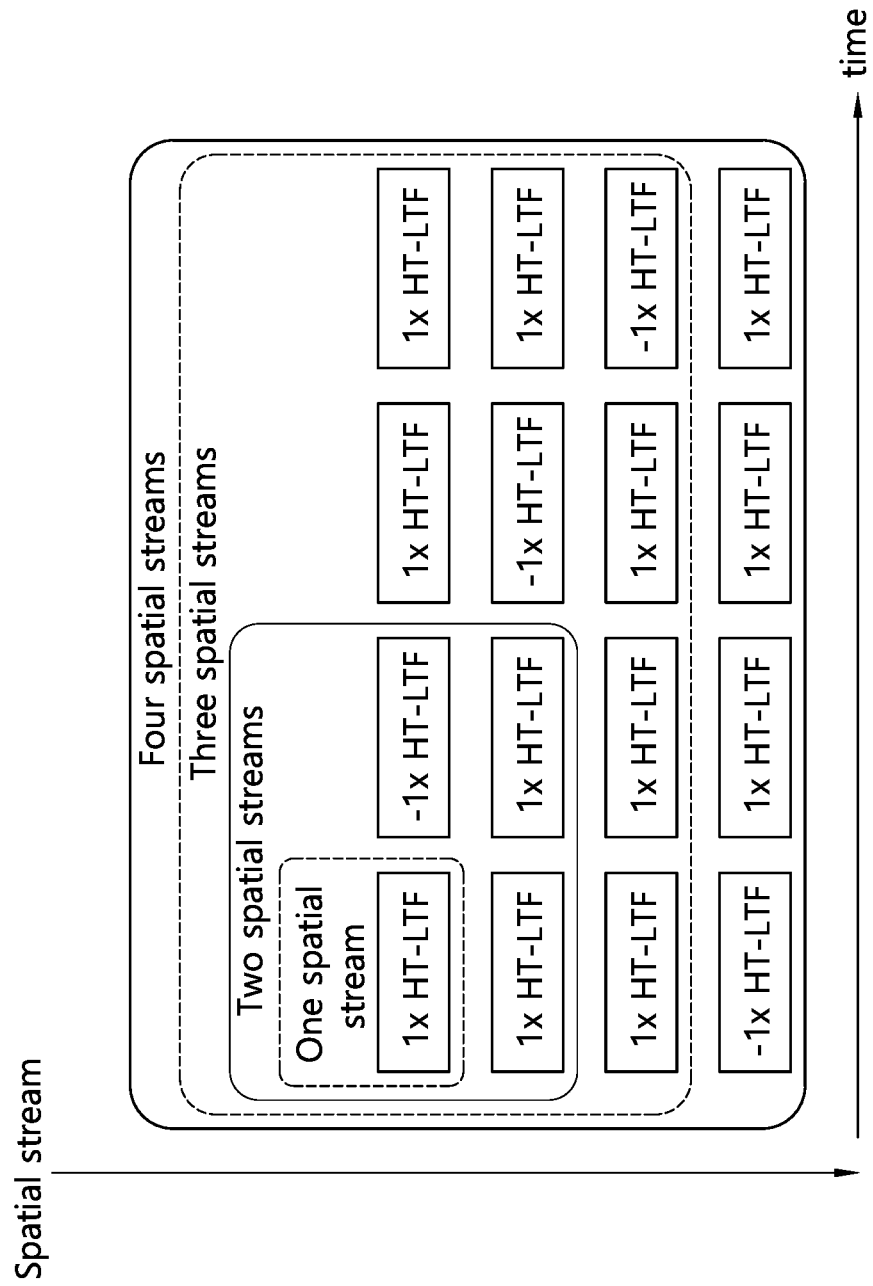
FIG. 8 is a diagram illustrating a concept for configuring an LTF symbol based on a conventional HTLTF generation sequence.

FIG. 8 is a diagram illustrating a concept for configuring an LTF symbol based on a conventional HTLTF generation sequence.

In an example of FIG. 8, a transverse axis indicates a time axis, and a longitudinal axis indicates a stream (STS). That is, in the example of FIG. 8, the transverse axis may indicate the number of HT LTF symbols (e.g., the number of OFDM symbols), and the longitudinal axis may indicate the number of supported streams.

When the P matrix is applied to a preset LTF generation sequence (i.e., HTLTF generation sequence) by a transmission STA (i.e., the LTF generation sequence is multiplied by the P matrix or the P matrix is applied to the LTF generation sequence according to the example of FIG. 7), the transmission STA may configure an LTF symbol, such as the example of FIG. 8.

The P matrix applied to FIG. 8 may be indicated as P_HTLTF, and may be the same as in an equation below.

$$P_{HTLTF} = \begin{bmatrix} 1 & -1 & 1 & 1 \\ 1 & 1 & -1 & 1 \\ 1 & 1 & 1 & -1 \\ -1 & 1 & 1 & 1 \end{bmatrix} \quad \text{[Equation 1]}$$

As in the example of FIG. 8, an LTF symbol (training symbol) is defined in a stream (i.e., STS) unit, and may be transmitted for channel estimation of each spatial stream. For example, when the number of space streams is 1, 2, or 4, 1, 2, or 4 LTF symbols may be transmitted, respectively. When the number of space streams is 3, one extra long training symbol may be added and four LTFs may be used.

If the P matrix is applied to a preset LTF generation sequence as in FIG. 8, a reception STA may perform channel estimation through an LTF symbol. That is, if a structure of a P matrix is previously known between transmission and reception STAs, the reception STA may perform channel estimation according to conventional various methods. In other words, if the structure of the P matrix is defined, a method of performing channel estimation through an LTF symbol to which a corresponding P matrix has been applied can be easily implemented by those skilled in the art.

For example, if a P matrix is determined as in Equation 2 and an LTF generation sequence to which the P matrix is applied is a conventional HTLTF generation sequence, channel estimation in a reception STA may be performed according to the following example.

$$\begin{bmatrix} 1 & -1 \\ 1 & 1 \end{bmatrix} \quad \text{[Equation 2]}$$

Specifically, an LTF symbol received by the reception STA may be the same as Equation 3.

$$\begin{bmatrix} r_1(t) \\ r_2(t) \end{bmatrix} = \begin{bmatrix} h_{11} & h_{12} \\ h_{21} & h_{22} \end{bmatrix} \begin{bmatrix} P_1(t) \\ P_2(t) \end{bmatrix} + \begin{bmatrix} n_1(t) \\ n_2(t) \end{bmatrix} \begin{pmatrix} P_1(t_1) = HTLTF \\ P_1(t_2) = -HTLTF \\ P_2(t_1) = HTLTF \\ P_2(t_2) = HTLTF \end{pmatrix} \quad \text{[Equation 3]}$$

wherein $h_{nm}$ represents a channel between an n-th antenna of a transmitter and an m-th antenna of a receiver, $P_{n(t)}$ represents a training symbol transmitted in the n-th antenna of the transmitter, and $n_m(t)$ represents additive white Gaussian noise (AWGN) experienced by the m-th antenna of the receiver. In Equation 3, if the equation is rearranged by substituting a training symbol, Equation 4 below may be obtained.

$$\begin{bmatrix} r_1(t_1) \\ r_2(t_1) \\ r_1(t_2) \\ r_2(t_2) \end{bmatrix} = \begin{bmatrix} h_{11} \times HTLTF + h_{12} \times HTLTF + n_1(t_1) \\ h_{21} \times HTLTF + h_{22} \times HTLTF + n_2(t_2) \\ -h_{11} \times HTLTF + h_{12} \times HTLTF + n_1(t_2) \\ -h_{21} \times HTLTF + h_{22} \times HTLTF + n_2(t_2) \end{bmatrix} \quad \text{[Equation 4]}$$

In Equation 4, if $h_{nm}$ is found with respect to both n and m, Equation 5 is obtained.

$$h_{11} = \frac{r_1(t_1) - r_1(t_2)}{2 \times HTLTF} \quad \text{[Equation 5]}$$

$$h_{12} = \frac{r_1(t_1) + r_1(t_2)}{2 \times HTLTF}$$

$$h_{21} = \frac{r_2(t_1) - r_2(t_2)}{2 \times HTLTF}$$

$$h_{22} = \frac{r_2(t_1) + r_2(t_2)}{2 \times HTLTF}$$

That is, if a structure of a P matrix is defined, the reception STA may perform channel estimation based on an LTF symbol to which a corresponding P matrix has been applied. Although the example is an example in which the example of Equation 2 has been applied, the reception STA may find $h_{nm}$ based on a conventional algorithm although an orthogonal matrix having various sizes, not the example of Equation 2, is applied.

Accordingly, hereinafter, for convenience of description, a structure of a P matrix is clearly defined, but a detailed description of an equation that performs channel estimation based on an LTF generation sequence to which a corresponding P matrix has been applied is omitted.

In the conventional IEEE 802.11ac and 11ax system, a structure of a P matrix supporting a maximum of 8 streams was proposed. For example, the P matrix of Equation 1 was used for one to four streams. Furthermore, in a conventional WLAN system, if the sum of STSs is 1, one LTF symbol is generated. If the sum of STSs is 2, two LTF symbols are generated. If the sum of STSs is 3 or 4, four LTF symbols are generated.

Furthermore, if the sum of streams is 5 or 6, Equation 6 below may be used.

$$P_{6\times6} = \begin{bmatrix} 1 & -1 & 1 & 1 & 1 & -1 \\ 1 & -w^1 & w^2 & w^3 & w^4 & -w^5 \\ 1 & -w^2 & w^4 & w^6 & w^8 & -w^{10} \\ 1 & -w^3 & w^6 & w^9 & w^{12} & -w^{15} \\ 1 & -w^4 & w^8 & w^{12} & w^{16} & -w^{20} \\ 1 & -w^5 & w^{10} & w^{15} & w^{20} & -w^{25} \end{bmatrix}$$ [Equation 6]

$w = \exp(-j*2\mathrm{pi}/6)$.

For reference, in this specification, pi means $\pi$.

Furthermore, in a conventional WLAN system, if the sum of STSs is 5 or 6, six LTF symbols are generated. Furthermore, if the sum of streams is 7 or 8, Equation 7 below may be used.

$$P = \begin{bmatrix} P_{4\times4} & P_{4\times4} \\ P_{4\times4} & -P_{4\times4} \end{bmatrix}$$ [Equation 7]

$$P_{4\times4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}$$

Furthermore, in a conventional WLAN system, if the sum of STSs is 7 or 8, eight LTF symbols are generated.

As described above, in the conventional WLAN system, LTF symbols are generated in a manner that a P matrix is applied (or multiplied) to an LTF sequence (e.g., HT/VHT/HE) sequence. Such a characteristic may be identically applied to an example of this specification.

Hereinafter, an example in which a P matrix is applied is described.

FIG. 9 is an example in which a P matrix is applied to an LTF sequence.

An LTF generation sequence (LTF_k) may be defined as a bit sequence. For example, the LTF generation sequence may be defined as LTF_k={LTF sub1, LTF sub2, LTF sub3, . . . , LTF subK}. That is, LTF_k may include k elements. That is, LTF sub1 to LTF subK may be indicated as complex values. The elements may correspond to various frequency bands of 20, 40, 80, 80+80, 160, 240, 160+160, 320 MHz, etc. For example, elements of LTF_k may be set based on preset subcarrier frequency spacing. For example, if subcarrier frequency spacing is set as 78.125 kHz, each of the elements of LTF_k may be mapped to a frequency band (i.e., the elements of LTF_k may be mapped at interval of 78.125 kHz) in a 78.125 kHz unit. The subcarrier frequency spacing may be set as 312.5/N kHz (N is a given integer).

As illustrated in FIG. 9, a P mapping matrix may be applied to an LTF generation sequence. That is, the LTF generation sequence may be multiplied by the P matrix. An operation of FIG. 9 may be performed in a transmission STA that transmits an LTF symbol.

The P mapping matrix may be variously set. In the example of FIG. 9, an illustrated 2-by-2 matrix is used. The mapping matrix of FIG. 9 includes four elements, and each element may have a complex value.

$$P = \begin{bmatrix} A_{11} & A_{12} \\ A_{21} & A_{22} \end{bmatrix}$$ [Equation 8]

If the P mapping matrix is applied to the LTF generation sequence (LTF_k), as illustrated, an LTF symbol/signal multiplied by an element of the P mapping matrix may be generated.

That is, as illustrated, the LTF symbol/signal may be transmitted through two OFDM symbols 930 and 940, and may correspond to two streams 910 and 920. For example, an LTF signal for the first stream 910 may be transmitted to a first reception STA, and an LTF signal for the second stream 920 may be transmitted to a second reception STA (or the first reception STA). Only some of the generated LTF signals may be used. For example, an LTF signal corresponding to only the first stream 910 or the second stream 920 may be transmitted. In other words, only some rows of a P mapping matrix may be used. That is, in a transmission STA, only some matrix of the P mapping matrix may be used/applied. As a result, the transmission STA may transmit an LTF symbol through the first stream 910 or the second stream 920.

The example of FIG. 9 may be applied to a case where the P mapping matrix is extended to an N-by-N matrix (N>2) without any change. Furthermore, only some of the N-by-N matrix may be used/applied depending on the number of streams used by a transmission STA. That is, the number of actually used/applied rows among all of the rows of the P mapping matrix may be the same as the sum of streams used by the transmission STA. For example, the example of FIG. 9 may be applied to an 8-by-8 P matrix without any change. If the sum of streams used by a transmission STA is 7, only 7 rows (e.g., the first 7 rows from the top) of the 8-by-8 P matrix may be used.

The number of columns of the P mapping matrix may correspond to the number of generated LTF symbols. That is, if a transmission STA applies only some columns of the P mapping matrix to an LTF generation sequence, the number of columns of the applied P matrix and the number of generated LTF symbols may be the same. One LTF symbol may be transmitted for a preset time (e.g., 4 us time), and may be transmitted through one OFDM symbol.

This specification proposes a scheme for generating an LTF symbol included in a PPDU having a new format. A conventional IEEE 802.11ax system supports only a maximum of 8 streams. This specification proposes a transmission/reception scheme supporting an increased number of streams in order to increase peak throughput. For example, a scheme according to this specification may support a maximum of 16 streams.

An LTF signal/symbol/sequence generated based on this specification may be called an EHT-LTF signal/symbol/sequence. However, the term EHT may be changed, and an example of this specification is not limited by the term EHT.

First Embodiment

The following embodiment proposes an example in which a P mapping matrix is generated based on a w value (w=exp(−j*2*pi/N)). The following embodiment may be based on variously defined LTF generation sequences. That is, an example of this specification is not limited to a specific LTF generation sequence.

If a P matrix is defined according to this specification, streams of an LTF signal/symbol to which the corresponding P matrix has been applied may be orthogonal to each other.

Number of Streams 9—First Embodiment

Specifically, a P mapping matrix may be defined as a 10-by-10 matrix as in Equation 9 below. Equation 9 may be used when the sum of streams used in a transmission STA is 9. In this case, the transmission STA may apply only 9 of the 10 rows of Equation 9 to an LTF generation sequence. For example, the transmission STA may apply only the first 9 of the 10 rows of Equation 9 to an LTF generation sequence.

$$[\text{Equation 9}]$$
$$\begin{bmatrix} 1 & -1 & 1 & 1 & 1 & -1 & 1 & 1 & 1 & -1; \\ 1 & -w & w^2 & w^3 & w^4 & -w^5 & w^6 & w^7 & w^8 & -w^9; \\ 1 & -w^2 & w^4 & w^6 & w^8 & -w^{10} & w^{12} & w^{14} & w^{16} & -w^{18}; \\ 1 & -w^3 & w^6 & w^9 & w^{12} & -w^{15} & w^{18} & w^{21} & w^{24} & -w^{27}; \\ 1 & -w^4 & w^8 & w^{12} & w^{16} & -w^{20} & w^{24} & w^{28} & w^{32} & -w^{36}; \\ 1 & -w^5 & w^{10} & w^{15} & w^{20} & -w^{25} & w^{30} & w^{35} & w^{40} & -w^{45}; \\ 1 & -w^6 & w^{12} & w^{18} & w^{24} & -w^{30} & w^{36} & w^{42} & w^{48} & -w^{54}; \\ 1 & -w^7 & w^{14} & w^{21} & w^{28} & -w^{35} & w^{42} & w^{49} & w^{56} & -w^{63}; \\ 1 & -w^8 & w^{16} & w^{24} & w^{32} & -w^{40} & w^{48} & w^{56} & w^{64} & -w^{72}; \\ 1 & -w^9 & w^{18} & w^{27} & w^{36} & -w^{45} & w^{54} & w^{63} & w^{72} & -w^{81}; \end{bmatrix}$$

In Equation 9, w may be defined as exp(−j*2*pi/10). That is, w may be determined as $e^{-j2\pi/10}$.

The example of Equation 9 may be additionally modified. For example, a "+" sign has been applied to the first column of Equation 9, and a "−" sign has been applied to the second column of Equation 9. However, symbols in each column may be variously modified.

That is, the example of Equation 9 may be modified like Equation 10. That is, the same sign (i.e., "+" or "−" sign) may be applied to any one column of Equation 9/10, and the "+" sign or "−" sign may be freely selected with respect to each column of Equation 9/10.

$$[\text{Equation 10}]$$
$$\begin{bmatrix} \pm 1 & \pm 1 & \pm 1 & \pm 1 & \pm 1 & \pm 1 & \pm 1 & \pm 1 & \pm 1 & \pm 1; \\ \pm 1 & \pm w & \pm w^2 & \pm w^3 & \pm w^4 & \pm w^5 & \pm w^6 & \pm w^7 & \pm w^8 & \pm w^9; \\ \pm 1 & \pm w^2 & \pm w^4 & \pm w^6 & \pm w^8 & \pm w^{10} & \pm w^{12} & \pm w^{14} & \pm w^{16} & \pm w^{18}; \\ \pm 1 & \pm w^3 & \pm w^6 & \pm w^9 & \pm w^{12} & \pm w^{15} & \pm w^{18} & \pm w^{21} & \pm w^{24} & \pm w^{27}; \\ \pm 1 & \pm w^4 & \pm w^8 & \pm w^{12} & \pm w^{16} & \pm w^{20} & \pm w^{24} & \pm w^{28} & \pm w^{32} & \pm w^{36}; \\ \pm 1 & \pm w^5 & \pm w^{10} & \pm w^{15} & \pm w^{20} & \pm w^{25} & \pm w^{30} & \pm w^{35} & \pm w^{40} & \pm w^{45}; \\ \pm 1 & \pm w^6 & \pm w^{12} & \pm w^{18} & \pm w^{24} & \pm w^{30} & \pm w^{36} & \pm w^{42} & \pm w^{48} & \pm w^{54}; \\ \pm 1 & \pm w^7 & \pm w^{14} & \pm w^{21} & \pm w^{28} & \pm w^{35} & \pm w^{42} & \pm w^{49} & \pm w^{56} & \pm w^{63}; \\ \pm 1 & \pm w^8 & \pm w^{16} & \pm w^{24} & \pm w^{32} & \pm w^{40} & \pm w^{48} & \pm w^{56} & \pm w^{64} & \pm w^{72}; \\ \pm 1 & \pm w^9 & \pm w^{18} & \pm w^{27} & \pm w^{36} & \pm w^{45} & \pm w^{54} & \pm w^{63} & \pm w^{72} & \pm w^{81}; \end{bmatrix}$$

Number of Streams 10—First Embodiment

Equation 11 may be used when the sum of streams used by a transmission STA is 10.

$$P10 = \begin{bmatrix} 1 & -1 & 1 & 1 & 1 & -1 & 1 & 1 & 1 & -1 \\ 1 & -w & w^2 & w^3 & w^4 & -w^5 & w^6 & w^7 & w^8 & -w^9 \\ 1 & -w^2 & w^4 & w^6 & w^8 & -w^{10} & w^{12} & w^{14} & w^{16} & -w^{18} \\ 1 & -w^3 & w^6 & w^9 & w^{12} & -w^{15} & w^{18} & w^{21} & w^{24} & -w^{27} \\ 1 & -w^4 & w^8 & w^{12} & w^{16} & -w^{20} & w^{24} & w^{28} & w^{32} & -w^{36} \\ 1 & -w^5 & w^{10} & w^{15} & w^{20} & -w^{25} & w^{30} & w^{35} & w^{40} & -w^{45} \\ 1 & -w^6 & w^{12} & w^{18} & w^{24} & -w^{30} & w^{36} & w^{42} & w^{48} & -w^{54} \\ 1 & -w^7 & w^{14} & w^{21} & w^{28} & -w^{35} & w^{42} & w^{49} & w^{56} & -w^{63} \\ 1 & -w^8 & w^{16} & w^{24} & w^{32} & -w^{40} & w^{48} & w^{56} & w^{64} & -w^{72} \\ 1 & -w^9 & w^{18} & w^{27} & w^{36} & -w^{45} & w^{54} & w^{63} & w^{72} & -w^{81} \end{bmatrix}$$

[Equation 11]

In Equation 11, w may be defined as $\exp(-j*2*pi/10)$.

As in another example, the same sign (i.e., "+" or "−" sign) may be applied to any one column of Equation 11, and the "+" sign or "−" sign may be freely selected with respect to each column of Equation 11.

Number of Streams 11—First Embodiment

A P mapping matrix according to this specification may be defined as a 12-by-12 matrix as in Equation 12 below. Equation 12 may be used when the sum of streams used by a transmission STA is 11. In this case, the transmission STA may apply only 11 rows of the 12 rows of Equation 12 to an LTF generation sequence. For example, the transmission STA may apply only the first 11 rows of the 12 rows of Equation 12 to LTF generation sequence.

$$\begin{bmatrix} 1 & -1 & 1 & 1 & 1 & -1 & 1 & 1 & 1 & -1 & 1 & 1 \\ 1 & -w & w^2 & w^3 & w^4 & -w^5 & w^6 & w^7 & w^8 & -w^9 & w^{10} & w^{11} \\ 1 & -w^2 & w^4 & w^6 & w^8 & -w^{10} & w^{12} & w^{14} & w^{16} & -w^{18} & w^{20} & w^{22} \\ 1 & -w^3 & w^6 & w^9 & w^{12} & -w^{15} & w^{18} & w^{21} & w^{24} & -w^{27} & w^{30} & w^{33} \\ 1 & -w^4 & w^8 & w^{12} & w^{16} & -w^{20} & w^{24} & w^{28} & w^{32} & -w^{32} & w^{40} & w^{44} \\ 1 & -w^5 & w^{10} & w^{15} & w^{20} & -w^{25} & w^{30} & w^{35} & w^{40} & -w^{45} & w^{50} & w^{55} \\ 1 & -w^6 & w^{12} & w^{18} & w^{24} & -w^{30} & w^{36} & w^{42} & w^{48} & -w^{54} & w^{60} & w^{66} \\ 1 & -w^7 & w^{14} & w^{21} & w^{28} & -w^{35} & w^{42} & w^{49} & w^{56} & -w^{63} & w^{70} & w^{77} \\ 1 & -w^8 & w^{16} & w^{24} & w^{32} & -w^{40} & w^{48} & w^{56} & w^{64} & -w^{72} & w^{80} & w^{88} \\ 1 & -w^9 & w^{18} & w^{27} & w^{36} & -w^{45} & w^{54} & w^{63} & w^{72} & -w^{81} & w^{90} & w^{99} \\ 1 & -w^{10} & w^{20} & w^{30} & w^{40} & -w^{50} & w^{60} & w^{70} & w^{80} & -w^{90} & w^{100} & w^{110} \\ 1 & -w^{11} & w^{22} & w^{33} & w^{44} & -w^{55} & w^{66} & w^{77} & w^{88} & -w^{99} & w^{110} & w^{121} \end{bmatrix}$$

[Equation 12]

In Equation 12, w may be defined as $\exp(-j*2*pi/12)$.

As in another example, the same sign (i.e., "+" or "−" sign) may be applied to any one column of Equation 12, and the "+" sign or "−" sign may be freely selected with respect to each column of Equation 12.

Additionally, this specification proposes a scheme for generating a 12-by-12 matrix based on a 6-by-6 matrix as in Equation 13 below. Equation 13 is the same as Equation 6.

$$P_{6\times 6} = \begin{bmatrix} 1 & -1 & 1 & 1 & 1 & -1 \\ 1 & -w^1 & w^2 & w^3 & w^4 & -w^5 \\ 1 & -w^2 & w^4 & w^6 & w^8 & -w^{10} \\ 1 & -w^3 & w^6 & w^9 & w^{12} & -w^{15} \\ 1 & -w^4 & w^8 & w^{12} & w^{16} & -w^{20} \\ 1 & -w^5 & w^{10} & w^{15} & w^{20} & -w^{25} \end{bmatrix}$$ [Equation 13]

$w = \exp(-j*2pi/6)$.

A P_6×6 matrix defined in Equation 13 may be extended to a 12-by-12 matrix based on Equation 14.

$$\begin{bmatrix} P_{6\times 6} & P_{6\times 6} \\ P_{6\times 6} & -P_{6\times 6} \end{bmatrix}, \begin{bmatrix} P_{6\times 6} & -P_{6\times 6} \\ P_{6\times 6} & P_{6\times 6} \end{bmatrix},$$
$$\begin{bmatrix} -P_{6\times 6} & P_{6\times 6} \\ P_{6\times 6} & P_{6\times 6} \end{bmatrix}, \text{ or } \begin{bmatrix} P_{6\times 6} & P_{6\times 6} \\ -P_{6\times 6} & P_{6\times 6} \end{bmatrix}$$ [Equation 14]

A transmission STA may apply only 11 rows of the 12 rows of Equation 14 to an LTF generation sequence. For example, the transmission STA may apply only the first 11 rows of the 12 rows of Equation 14 to the LTF generation sequence.

As in another example, the same sign (i.e., "+" or "−" sign) may be applied to any one column of Equation 14, and the "+" sign or "−" sign may be freely selected with respect to each column of Equation 14.

Number of Streams 12—First Embodiment

A P mapping matrix according to this specification may be defined as a 12-by-12 matrix as Equation 15 below. Equation 15 may be used when the sum of streams used by a transmission STA is 12.

[Equation 15]

```
[1   -1    1     1     1    -1    1     1     1    -1     1     1;

1   -w    w^2   w^3   w^4  -w^5  w^6   w^7   w^8  -w^9   w^10  w^11;

1   -w^2  w^4   w^6   w^8  -w^10 w^12  w^14  w^16 -w^18  w^20  w^22;

1   -w^3  w^6   w^9   w^12 -w^15 w^18  w^21  w^24 -w^27  w^30  w^33;

1   -w^4  w^8   w^12  w^16 -w^20 w^24  w^28  w^32 -w^36  w^40  w^44;

1   -w^5  w^10  w^15  w^20 -w^25 w^30  w^35  w^40 -w^45  w^50  w^55;

1   -w^6  w^12  w^18  w^24 -w^30 w^36  w^42  w^48 -w^54  w^60  w^66;

1   -w^7  w^14  w^21  w^28 -w^35 w^42  w^49  w^56 -w^63  w^70  w^77;

1   -w^8  w^16  w^24  w^32 -w^40 w^48  w^56  w^64 -w^72  w^80  w^88;
 1   -w^9  w^18  w^27  w^36 -w^45 w^54  w^63  w^72 -w^81  w^90  w^99;
 1   -w^10 w^20  w^30  w^40 -w^50 w^60  w^70  w^80 -w^90  w^100 w^110;
 1   -w^11 w^22  w^33  w^44 -w^55 w^66  w^77  w^88 -w^99  w^110 w^121;
];
```

In Equation 15, w may be defined as exp(−j*2*pi/12).

Additionally, this specification proposes a scheme for generating a 12-by-12 matrix based on a 6-by-6 matrix, such as Equation 16 below. Equation 16 is the same as Equation 6.

$$P_{6\times 6} = \begin{bmatrix} 1 & -1 & 1 & 1 & 1 & -1 \\ 1 & -w^1 & w^2 & w^3 & w^4 & -w^5 \\ 1 & -w^2 & w^4 & w^6 & w^8 & -w^{10} \\ 1 & -w^3 & w^6 & w^9 & w^{12} & -w^{15} \\ 1 & -w^4 & w^8 & w^{12} & w^{16} & -w^{20} \\ 1 & -w^5 & w^{10} & w^{15} & w^{20} & -w^{25} \end{bmatrix} \quad \text{[Equation 16]}$$

$$w = \exp(-j^*2pi/6).$$

A P_6×6 matrix defined in Equation 16 may be extended to a 12-by-12 matrix based on Equation 17.

$$\begin{bmatrix} P_{6\times 6} & P_{6\times 6} \\ P_{6\times 6} & -P_{6\times 6} \end{bmatrix}, \begin{bmatrix} P_{6\times 6} & -P_{6\times 6} \\ P_{6\times 6} & P_{6\times 6} \end{bmatrix}, \begin{bmatrix} -P_{6\times 6} & P_{6\times 6} \\ P_{6\times 6} & P_{6\times 6} \end{bmatrix}, \text{ or } \begin{bmatrix} P_{6\times 6} & P_{6\times 6} \\ -P_{6\times 6} & P_{6\times 6} \end{bmatrix} \quad \text{[Equation 17]}$$

As in another example, the same sign (i.e., "+" or "−" sign) may be applied to any one column of Equation 15/17. The "+" sign or "−" sign may be freely selected with respect to each column of Equation 15/17.

Number of Streams 13—First Embodiment

A P mapping matrix according to this specification may be defined as a 14-by-14 matrix as in Equation 18 below. Equation 18 may be used when the sum of streams used by a transmission STA is 13. In this case, the transmission STA may apply only 13 rows of the 14 rows of Equation 18 to an LTF generation sequence. For example, the transmission STA may apply only the first 13 rows of the 14 rows of Equation 18 to LTF generation sequence.

$$\begin{bmatrix}
1 & -1 & 1 & 1 & 1 & -1 & 1 & 1 & 1 & -1 & 1 & 1 & 1 & -1; \\
1 & -w & w^2 & w^3 & w^4 & -w^5 & w^6 & w^7 & w^8 & -w^9 & w^{10} & w^{11} & w^{12} & -w^{13}; \\
1 & -w^2 & w^4 & w^6 & w^8 & -w^{10} & w^{12} & w^{14} & w^{16} & -w^{18} & w^{20} & w^{22} & w^{24} & -w^{26}; \\
1 & -w^3 & w^6 & w^9 & w^{12} & -w^{15} & w^{18} & w^{21} & w^{24} & -w^{27} & w^{30} & w^{33} & w^{36} & -w^{39}; \\
1 & -w^4 & w^8 & w^{12} & w^{16} & -w^{20} & w^{24} & w^{28} & w^{32} & -w^{36} & w^{40} & w^{44} & w^{48} & -w^{52}; \\
1 & -w^5 & w^{10} & w^{15} & w^{20} & -w^{25} & w^{30} & w^{35} & w^{40} & -w^{45} & w^{50} & w^{55} & w^{60} & -w^{65}; \\
1 & -w^6 & w^{12} & w^{18} & w^{24} & -w^{30} & w^{36} & w^{42} & w^{48} & -w^{54} & w^{60} & w^{66} & w^{72} & -w^{78}; \\
1 & -w^7 & w^{14} & w^{21} & w^{28} & -w^{35} & w^{42} & w^{49} & w^{56} & -w^{63} & w^{70} & w^{77} & w^{84} & -w^{91}; \\
1 & -w^8 & w^{16} & w^{24} & w^{32} & -w^{40} & w^{48} & w^{56} & w^{64} & -w^{72} & w^{80} & w^{88} & w^{96} & -w^{104}; \\
1 & -w^9 & w^{18} & w^{27} & w^{36} & -w^{45} & w^{54} & w^{63} & w^{72} & -w^{81} & w^{90} & w^{99} & w^{108} & -w^{117}; \\
1 & -w^{10} & w^{20} & w^{30} & w^{40} & -w^{50} & w^{60} & w^{70} & w^{80} & -w^{90} & w^{100} & w^{110} & w^{120} & -w^{130}; \\
1 & -w^{11} & w^{22} & w^{33} & w^{44} & -w^{55} & w^{66} & w^{77} & w^{88} & -w^{99} & w^{110} & w^{121} & w^{132} & -w^{143}; \\
1 & -w^{12} & w^{24} & w^{36} & w^{48} & -w^{60} & w^{72} & w^{84} & w^{96} & -w^{108} & w^{120} & w^{132} & w^{144} & -w^{156}; \\
1 & -w^{13} & w^{26} & w^{39} & w^{52} & -w^{65} & w^{78} & w^{91} & w^{104} & -w^{117} & w^{130} & w^{143} & w^{156} & -w^{169};
\end{bmatrix} \quad \text{[Equation 18]}$$

In Equation 18, w may be defined as exp(−j*2*pi/14).

As in another example, the same sign (i.e., "+" or "−" sign) may be applied to any one column of Equation 18, and the "+" sign or "−" sign may be freely selected with respect to each column of Equation 18.

Number of Streams 14—First Embodiment

A P mapping matrix according to this specification may be defined as a 14-by-14 matrix as in Equation 19 below. Equation 19 may be used when the sum of streams used by a transmission STA is 14.

$$\begin{bmatrix}
1 & -1 & 1 & 1 & 1 & -1 & 1 & 1 & 1 & -1 & 1 & 1 & 1 & -1 \\
1 & -w & w^2 & w^3 & w^4 & -w^5 & w^6 & w^7 & w^8 & -w^9 & w^{10} & w^{11} & w^{12} & -w^{13} \\
1 & -w^2 & w^4 & w^6 & w^8 & -w^{10} & w^{12} & w^{14} & w^{16} & -w^{18} & w^{20} & w^{22} & w^{24} & -w^{26} \\
1 & -w^3 & w^6 & w^9 & w^{12} & -w^{15} & w^{18} & w^{21} & w^{24} & -w^{27} & w^{30} & w^{33} & w^{36} & -w^{39} \\
1 & -w^4 & w^8 & w^{12} & w^{16} & -w^{20} & w^{24} & w^{28} & w^{32} & -w^{36} & w^{40} & w^{44} & w^{48} & -w^{52} \\
1 & -w^5 & w^{10} & w^{15} & w^{20} & -w^{25} & w^{30} & w^{35} & w^{40} & -w^{45} & w^{50} & w^{55} & w^{60} & -w^{65} \\
1 & -w^6 & w^{12} & w^{18} & w^{24} & -w^{30} & w^{36} & w^{42} & w^{48} & -w^{54} & w^{60} & w^{66} & w^{72} & -w^{78} \\
1 & -w^7 & w^{14} & w^{21} & w^{28} & -w^{35} & w^{42} & w^{49} & w^{56} & -w^{63} & w^{70} & w^{77} & w^{84} & -w^{91} \\
1 & -w^8 & w^{16} & w^{24} & w^{32} & -w^{40} & w^{48} & w^{56} & w^{64} & -w^{72} & w^{80} & w^{88} & w^{96} & -w^{104} \\
1 & -w^9 & w^{18} & w^{27} & w^{36} & -w^{45} & w^{54} & w^{63} & w^{72} & -w^{81} & w^{90} & w^{99} & w^{108} & -w^{117} \\
1 & -w^{10} & w^{20} & w^{30} & w^{40} & -w^{50} & w^{60} & w^{70} & w^{80} & -w^{90} & w^{100} & w^{110} & w^{120} & -w^{130} \\
1 & -w^{11} & w^{22} & w^{33} & w^{44} & -w^{55} & w^{66} & w^{77} & w^{88} & -w^{99} & w^{110} & w^{121} & w^{132} & -w^{143} \\
1 & -w^{12} & w^{24} & w^{36} & w^{48} & -w^{60} & w^{72} & w^{84} & w^{96} & -w^{108} & w^{120} & w^{132} & w^{144} & -w^{156} \\
1 & -w^{13} & w^{26} & w^{39} & w^{52} & -w^{65} & w^{78} & w^{91} & w^{104} & -w^{117} & w^{130} & w^{143} & w^{156} & -w^{169}
\end{bmatrix} \quad [\text{Equation 19}]$$

In Equation 19, w may be defined as exp(−j*2*pi/14).

As in another example, the same sign (i.e., "+" or "−" sign) may be applied to any one column of Equation 19, and the "+" sign or "−" sign may be freely selected with respect to each column of Equation 19.

Number of Streams 15—First Embodiment

A P mapping matrix according to this specification may be defined as a 16-by-16 matrix as in Equation 20 below. Equation 20 may be used when the sum of streams used by a transmission STA is 15. In this case, the transmission STA may apply only 15 rows of the 16 rows of Equation 20 to an LTF generation sequence. For example, the transmission STA may apply only the first 15 rows of the 16 rows of Equation 20 to the LTF generation sequence.

$$\begin{bmatrix}
1 & -1 & 1 & 1 & 1 & -1 & 1 & 1 & 1 & -1 & 1 & 1 & 1 & -1 & 1 & 1 \\
1 & -w & w^2 & w^3 & w^4 & -w^5 & w^6 & w^7 & w^8 & -w^9 & w^{10} & w^{11} & w^{12} & -w^{13} & w^{14} & w^{15} \\
1 & -w^2 & w^4 & w^6 & w^8 & -w^{10} & w^{12} & w^{14} & w^{16} & -w^{18} & w^{20} & w^{22} & w^{24} & -w^{26} & w^{28} & w^{30} \\
1 & -w^3 & w^6 & w^9 & w^{12} & -w^{15} & w^{18} & w^{21} & w^{24} & -w^{27} & w^{30} & w^{33} & w^{36} & -w^{39} & w^{42} & w^{45} \\
1 & -w^4 & w^8 & w^{12} & w^{16} & -w^{20} & w^{24} & w^{28} & w^{32} & -w^{36} & w^{40} & w^{44} & w^{48} & -w^{52} & w^{56} & w^{60} \\
1 & -w^5 & w^{10} & w^{15} & w^{20} & -w^{25} & w^{30} & w^{35} & w^{40} & -w^{45} & w^{50} & w^{55} & w^{60} & -w^{65} & w^{70} & w^{75} \\
1 & -w^6 & w^{12} & w^{18} & w^{24} & -w^{30} & w^{36} & w^{42} & w^{48} & -w^{54} & w^{60} & w^{66} & w^{72} & -w^{78} & w^{84} & w^{90} \\
1 & -w^7 & w^{14} & w^{21} & w^{28} & -w^{35} & w^{42} & w^{49} & w^{56} & -w^{63} & w^{70} & w^{77} & w^{84} & -w^{91} & w^{98} & w^{105} \\
1 & -w^8 & w^{16} & w^{24} & w^{32} & -w^{40} & w^{48} & w^{56} & w^{64} & -w^{72} & w^{80} & w^{88} & w^{96} & -w^{104} & w^{112} & w^{120} \\
1 & -w^9 & w^{18} & w^{27} & w^{36} & -w^{45} & w^{54} & w^{63} & w^{72} & -w^{81} & w^{90} & w^{99} & w^{108} & -w^{117} & w^{126} & w^{135} \\
1 & -w^{10} & w^{20} & w^{30} & w^{40} & -w^{50} & w^{60} & w^{70} & w^{80} & -w^{90} & w^{100} & w^{110} & w^{120} & -w^{130} & w^{140} & w^{150} \\
1 & -w^{11} & w^{22} & w^{33} & w^{44} & -w^{55} & w^{66} & w^{77} & w^{88} & -w^{99} & w^{110} & w^{121} & w^{132} & -w^{143} & w^{154} & w^{165} \\
1 & -w^{12} & w^{24} & w^{36} & w^{48} & -w^{60} & w^{72} & w^{84} & w^{96} & -w^{108} & w^{120} & w^{132} & w^{144} & -w^{156} & w^{168} & w^{180} \\
1 & -w^{13} & w^{26} & w^{39} & w^{52} & -w^{65} & w^{78} & w^{91} & w^{104} & -w^{117} & w^{130} & w^{143} & w^{156} & -w^{169} & w^{182} & w^{195} \\
1 & -w^{14} & w^{28} & w^{42} & w^{56} & -w^{70} & w^{84} & w^{98} & w^{112} & -w^{126} & w^{140} & w^{154} & w^{168} & -w^{182} & w^{196} & w^{210} \\
1 & -w^{15} & w^{30} & w^{45} & w^{60} & -w^{75} & w^{90} & w^{105} & w^{120} & -w^{135} & w^{150} & w^{165} & w^{180} & -w^{195} & w^{210} & w^{225}
\end{bmatrix} \quad [\text{Equation 20}]$$

In Equation 20, w may be defined as exp(−j*2*pi/16).

Additionally, this specification proposes a scheme for generating a 16-by-16 matrix based on an 8-by-8 matrix, such as Equation 21 below.

$$P_{8\times 8} = \begin{bmatrix} P_{4\times 4} & P_{4\times 4} \\ P_{4\times 4} & -P_{4\times 4} \end{bmatrix} \quad \text{[Equation 21]}$$

$$P_{4\times 4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}$$

A P_8×8 matrix defined in Equation 21 may be extended to a 16-by-16 matrix based on Equation 22.

$$\begin{bmatrix} P_{8\times 8} & P_{8\times 8} \\ P_{8\times 8} & -P_{8\times 8} \end{bmatrix}, \begin{bmatrix} P_{8\times 8} & -P_{8\times 8} \\ P_{8\times 8} & P_{8\times 8} \end{bmatrix},$$
$$\begin{bmatrix} -P_{8\times 8} & P_{8\times 8} \\ P_{8\times 8} & P_{8\times 8} \end{bmatrix}, \text{ or } \begin{bmatrix} P_{8\times 8} & P_{8\times 8} \\ -P_{8\times 8} & P_{8\times 8} \end{bmatrix} \quad \text{[Equation 22]}$$

A transmission STA may apply only 15 rows of the 16 rows of Equation 22 to an LTF generation sequence. For example, the transmission STA may apply only the first 15 rows of the 16 rows of Equation 22 to the LTF generation sequence.

As in another example, the same sign (i.e., "+" or "−" sign) may be applied to any one column of Equation 20/22. The "+" sign or "−" sign may be freely selected with respect to each column of Equation 20/22.

Number of Streams 16—First Embodiment

A P mapping matrix according to this specification may be defined as a 16-by-16 matrix as in Equation 23 below. Equation 20 may be used when the sum of streams used by a transmission STA is 16.

$$\begin{bmatrix}
1 & -1 & 1 & 1 & 1 & -1 & 1 & 1 & 1 & -1 & 1 & 1 & 1 & -1 & 1 & 1; \\
1 & -w & w^2 & w^3 & w^4 & -w^5 & w^6 & w^7 & w^8 & -w^9 & w^{10} & w^{11} & w^{12} & -w^{13} & w^{14} & w^{15}; \\
1 & -w^2 & w^4 & w^6 & w^8 & -w^{10} & w^{12} & w^{14} & w^{16} & -w^{18} & w^{20} & w^{22} & w^{24} & -w^{26} & w^{28} & w^{30}; \\
1 & -w^3 & w^6 & w^9 & w^{12} & -w^{15} & w^{18} & w^{21} & w^{24} & -w^{27} & w^{30} & w^{33} & w^{36} & -w^{39} & w^{42} & w^{45}; \\
1 & -w^4 & w^8 & w^{12} & w^{16} & -w^{20} & w^{24} & w^{28} & w^{32} & -w^{36} & w^{40} & w^{44} & w^{48} & -w^{52} & w^{56} & w^{60}; \\
1 & -w^5 & w^{10} & w^{15} & w^{20} & -w^{25} & w^{30} & w^{35} & w^{40} & -w^{45} & w^{50} & w^{55} & w^{60} & -w^{65} & w^{70} & w^{75}; \\
1 & -w^6 & w^{12} & w^{18} & w^{24} & -w^{30} & w^{36} & w^{42} & w^{48} & -w^{54} & w^{60} & w^{66} & w^{72} & -w^{78} & w^{84} & w^{90}; \\
1 & -w^7 & w^{14} & w^{21} & w^{28} & -w^{35} & w^{42} & w^{49} & w^{56} & -w^{63} & w^{70} & w^{77} & w^{84} & -w^{91} & w^{98} & w^{105}; \\
1 & -w^8 & w^{16} & w^{24} & w^{32} & -w^{40} & w^{48} & w^{56} & w^{64} & -w^{72} & w^{80} & w^{88} & w^{96} & -w^{104} & w^{112} & w^{120}; \\
1 & -w^9 & w^{18} & w^{27} & w^{36} & -w^{45} & w^{54} & w^{63} & w^{72} & -w^{81} & w^{90} & w^{99} & w^{108} & -w^{117} & w^{126} & w^{135}; \\
1 & -w^{10} & w^{20} & w^{30} & w^{40} & -w^{50} & w^{60} & w^{70} & w^{80} & -w^{90} & w^{100} & w^{110} & w^{120} & -w^{130} & w^{140} & w^{150}; \\
1 & -w^{11} & w^{22} & w^{33} & w^{44} & -w^{55} & w^{66} & w^{77} & w^{88} & -w^{99} & w^{110} & w^{121} & w^{132} & -w^{143} & w^{154} & w^{165}; \\
1 & -w^{12} & w^{24} & w^{36} & w^{48} & -w^{60} & w^{72} & w^{84} & w^{96} & -w^{108} & w^{120} & w^{132} & w^{144} & -w^{156} & w^{168} & w^{180}; \\
1 & -w^{13} & w^{26} & w^{39} & w^{52} & -w^{65} & w^{78} & w^{91} & w^{104} & -w^{117} & w^{130} & w^{143} & w^{156} & -w^{169} & w^{182} & w^{195}; \\
1 & -w^{14} & w^{28} & w^{42} & w^{56} & -w^{70} & w^{84} & w^{98} & w^{112} & -w^{126} & w^{140} & w^{154} & w^{168} & -w^{182} & w^{196} & w^{210}; \\
1 & -w^{15} & w^{30} & w^{45} & w^{60} & -w^{75} & w^{90} & w^{105} & w^{120} & -w^{135} & w^{150} & w^{165} & w^{180} & -w^{195} & w^{210} & w^{225};
\end{bmatrix}$$

[Equation 23]

In Equation 23, w may be defined as exp(−j*2*pi/16).

Additionally, this specification proposes a scheme for generating a 16-by-16 matrix based on an 8-by-8 matrix, such as Equation 24 below.

$$P_{8\times8} = \begin{bmatrix} P_{4\times4} & P_{4\times4} \\ P_{4\times4} & -P_{4\times4} \end{bmatrix} \qquad \text{[Equation 24]}$$

$$P_{4\times4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}$$

A P_8×8 matrix defined in Equation 24 may be extended to a 16-by-16 matrix based on Equation 25.

$$\begin{bmatrix} P_{8\times8} & P_{8\times8} \\ P_{8\times8} & -P_{8\times8} \end{bmatrix}, \begin{bmatrix} P_{8\times8} & -P_{8\times8} \\ P_{8\times8} & P_{8\times8} \end{bmatrix}, \qquad \text{[Equation 25]}$$

$$\begin{bmatrix} -P_{8\times8} & P_{8\times8} \\ P_{8\times8} & P_{8\times8} \end{bmatrix}, \text{ or } \begin{bmatrix} P_{8\times8} & P_{8\times8} \\ -P_{8\times8} & P_{8\times8} \end{bmatrix}$$

As in another example, the same sign (i.e., "+" or "−" sign) may be applied to any one column of Equation 23/25. The "+" sign or "−" sign may be freely selected with respect to each column of Equation 23/25.

Second Embodiment

The following example proposes matrices P_2×2, P_4×4, P_8×8, and P_16×16. When the sum of streams used by a transmission STA is 1 or 2, P_2×2 may be used. When the sum of streams is 3 or 4, P_4×4 may be used. When the sum of streams is 5, 6, 7, or 8, P_8×8 may be used. When the sum of streams is 9 to 16, P_16×16 may be used. Furthermore, a transmission STA may use the second embodiment if the sum of streams is a preset number X (e.g., 7, 8, 15 and/or 16), and may use the matrix of the first/third/fourth embodiment if not.

For example, the matrices P_2×2, P_4×4, P_8×8, and P_16×16 according to this specification may be defined based on any one of Equation 26 to Equation 29.

$$P2\times2 = \begin{bmatrix} 1 & -1 \\ 1 & 1 \end{bmatrix} \qquad \text{[Equation 26]}$$

$$P4\times4 = \begin{bmatrix} P2\times2 & -P2\times2 \\ P2\times2 & P2\times2 \end{bmatrix}$$

$$P8\times8 = \begin{bmatrix} P4\times4 & -P4\times4 \\ P4\times4 & P4\times4 \end{bmatrix}$$

$$P16\times16 = \begin{bmatrix} P8\times8 & -P8\times8 \\ P8\times8 & P8\times8 \end{bmatrix};$$

$$P2\times2 = \begin{bmatrix} -1 & 1 \\ 1 & 1 \end{bmatrix} \qquad \text{[Equation 27]}$$

$$P4\times4 = \begin{bmatrix} -P2\times2 & P2\times2 \\ P2\times2 & P2\times2 \end{bmatrix}$$

$$P8\times8 = \begin{bmatrix} -P4\times4 & P4\times4 \\ P4\times4 & P4\times4 \end{bmatrix}$$

$$P16\times16 = \begin{bmatrix} -P8\times8 & P8\times8 \\ P8\times8 & P8\times8 \end{bmatrix};$$

$$P2\times2 = \begin{bmatrix} 1 & 1 \\ 1 & -1 \end{bmatrix} \qquad \text{[Equation 28]}$$

$$P4\times4 = \begin{bmatrix} P2\times2 & P2\times2 \\ P2\times2 & -P2\times2 \end{bmatrix}$$

$$P8\times8 = \begin{bmatrix} P4\times4 & P4\times4 \\ P4\times4 & -P4\times4 \end{bmatrix}$$

$$P16\times16 = \begin{bmatrix} P8\times8 & P8\times8 \\ P8\times8 & -P8\times8 \end{bmatrix};$$

$$P2\times2 = \begin{bmatrix} 1 & -1 \\ -1 & 1 \end{bmatrix} \qquad \text{[Equation 29]}$$

$$P4\times4 = \begin{bmatrix} P2\times2 & P2\times2 \\ -P2\times2 & P2\times2 \end{bmatrix}$$

$$P8\times8 = \begin{bmatrix} P4\times4 & P4\times4 \\ -P4\times4 & P4\times4 \end{bmatrix}$$

$$P16\times16 = \begin{bmatrix} P8\times8 & P8\times8 \\ -P8\times8 & P8\times8 \end{bmatrix};$$

Third Embodiment

The following embodiment defines a P mapping matrix based on a discrete Fourier transform (DFT) matrix. Hereinafter, the sum of streams used by a transmission STA is indicated as N.

In this case, a DFT matrix proposed by this specification, that is, a P mapping matrix, is as follows.

$$\begin{bmatrix} w^0 & w^0 & w^0 & \cdots & w^0 & w^0 \\ w^0 & w^1 & w^2 & \cdots & w^{(N-2)} & w^{(N-1)} \\ w^0 & w^2 & w^4 & \cdots & w^{(2N-4)} & w^{(2N-2)} \\ & & & \cdots & & \\ w^0 & w^{(N-1)} & w^{(2N-2)} & \cdots & w^{((N-2)*(N-1))} & w^{((N-1)*(N-1))} \end{bmatrix} \qquad \text{[Equation 30]}$$

In Equation 30, w=exp(−j*2*pi/N) is defined.

The transmission STA may use the P mapping matrix of Equation 30 and the P mapping matrix of the first/second/fourth embodiment together. That is, the matrix of Equation 30 may be used when the sum of streams is X. In other cases, the P mapping matrix of the first/second/fourth embodiment may be together used.

The same sign (i.e., "+" or "−" sign) may be applied to any one column of a matrix proposed in the third embodiment. The "+" sign or "−" sign may be freely selected with respect to each column of the matrix proposed in the third embodiment.

Furthermore, a P mapping matrix may be newly defined in a way to define a P mapping matrix having a relatively small size and to extend a P mapping matrix having a small size.

If N=3, a 3-by-3 P matrix may be defined like Equation 31.

$$[1 \quad 1 \quad 1$$
$$1 \quad w^\wedge 1 \quad w^\wedge 2$$
$$1 \quad w^\wedge 2 \quad w^\wedge 4]$$
$$w = \exp(-j^*2^*pi/3)$$
[Equation 31]

Equation 31 may be extended to a 6-by-6 matrix through Equation 32.

$$\begin{bmatrix} P_{3\times 3} & P_{3\times 3} \\ P_{33\times 3} & -P_{3\times 3} \end{bmatrix}, \begin{bmatrix} P_{3\times 3} & -P_{3\times 3} \\ P_{3\times 3} & P_{3\times 3} \end{bmatrix},$$
$$\begin{bmatrix} -P_{3\times 3} & P_{3\times 3} \\ P_{3\times 3} & P_{3\times 3} \end{bmatrix}, \text{ or } \begin{bmatrix} P_{3\times 3} & P_{3\times 3} \\ -P_{3\times 3} & P_{3\times 3} \end{bmatrix}$$
[Equation 32]

Furthermore, the 6-by-6 matrix generated through Equation 32 may be extended to a 12-by-12 matrix through Equation 33.

$$\begin{bmatrix} P_{6\times 6} & P_{6\times 6} \\ P_{6\times 6} & -P_{6\times 6} \end{bmatrix}, \begin{bmatrix} P_{6\times 6} & -P_{6\times 6} \\ P_{6\times 6} & P_{6\times 6} \end{bmatrix},$$
$$\begin{bmatrix} -P_{6\times 6} & P_{6\times 6} \\ P_{6\times 6} & P_{6\times 6} \end{bmatrix}, \text{ or } \begin{bmatrix} P_{6\times 6} & P_{6\times 6} \\ -P_{6\times 6} & P_{6\times 6} \end{bmatrix}$$
[Equation 33]

If N=5, a 5-by-5 P matrix may be defined like Equation 34.

$$[1 \quad 1 \quad 1 \quad 1 \quad 1$$
$$1 \quad w^\wedge 1 \quad w^\wedge 2 \quad w^\wedge 3 \quad w^\wedge 4$$
$$1 \quad w^\wedge 2 \quad w^\wedge 4 \quad w^\wedge 6 \quad w^\wedge 8$$
$$1 \quad w^\wedge 3 \quad w^\wedge 6 \quad w^\wedge 9 \quad w^\wedge 12$$
$$1 \quad w^\wedge 4 \quad w^\wedge 8 \quad w^\wedge 12 \quad w^\wedge 16]$$
$$w = \exp(-j^*2^*pi/5)$$
[Equation 34]

Equation 34 may be extended to a 10-by-10 matrix through Equation 35.

$$\begin{bmatrix} P_{5\times 5} & P_{5\times 5} \\ P_{5\times 5} & -P_{5\times 5} \end{bmatrix}, \begin{bmatrix} P_{5\times 5} & -P_{5\times 5} \\ P_{5\times 5} & P_{5\times 5} \end{bmatrix},$$
$$\begin{bmatrix} -P_{5\times 5} & P_{5\times 5} \\ P_{5\times 5} & P_{5\times 5} \end{bmatrix}, \text{ or } \begin{bmatrix} P_{5\times 5} & P_{5\times 5} \\ -P_{5\times 5} & P_{5\times 5} \end{bmatrix}$$
[Equation 35]

If N=6, a 6-by-6 P matrix may be defined like Equation 36.

$$P6 \times 6 = \begin{bmatrix} 1 & 1 & 1 & 1 & 1 & 1 \\ 1 & w^\wedge 1 & w^\wedge 2 & w^\wedge 3 & w^\wedge 4 & w^\wedge 5 \\ 1 & w^\wedge 2 & w^\wedge 4 & w^\wedge 6 & w^\wedge 8 & w^\wedge 10 \\ 1 & w^\wedge 3 & w^\wedge 6 & w^\wedge 9 & w^\wedge 12 & w^\wedge 15 \\ 1 & w^\wedge 4 & w^\wedge 8 & w^\wedge 12 & w^\wedge 16 & w^\wedge 20 \\ 1 & w^\wedge 5 & w^\wedge 10 & w^\wedge 15 & w^\wedge 20 & w^\wedge 25 \end{bmatrix};$$
$$w = \exp(-j^*2^*pi/6)$$
[Equation 36]

Equation 36 may be extended to a 12-by-12 matrix through Equation 37.

$$\begin{bmatrix} P_{6\times 6} & P_{6\times 6} \\ P_{6\times 6} & -P_{6\times 6} \end{bmatrix}, \begin{bmatrix} P_{6\times 6} & -P_{6\times 6} \\ P_{6\times 6} & P_{6\times 6} \end{bmatrix},$$
$$\begin{bmatrix} -P_{6\times 6} & P_{6\times 6} \\ P_{6\times 6} & P_{6\times 6} \end{bmatrix}, \text{ or } \begin{bmatrix} P_{6\times 6} & P_{6\times 6} \\ -P_{6\times 6} & P_{6\times 6} \end{bmatrix}$$
[Equation 37]

If N=7, a 7-by-7 P matrix may be defined like Equation 38.

$$[1 \quad 1 \quad 1 \quad 1 \quad 1 \quad 1 \quad 1$$
$$1 \quad w^\wedge 1 \quad w^\wedge 2 \quad w^\wedge 3 \quad w^\wedge 4 \quad w^\wedge 5 \quad w^\wedge 6$$
$$1 \quad w^\wedge 2 \quad w^\wedge 4 \quad w^\wedge 6 \quad w^\wedge 8 \quad w^\wedge 10 \quad w^\wedge 12$$
$$1 \quad w^\wedge 3 \quad w^\wedge 6 \quad w^\wedge 9 \quad w^\wedge 12 \quad w^\wedge 15 \quad w^\wedge 18$$
$$1 \quad w^\wedge 4 \quad w^\wedge 8 \quad w^\wedge 12 \quad w^\wedge 16 \quad w^\wedge 20 \quad w^\wedge 24$$
$$1 \quad w^\wedge 5 \quad w^\wedge 10 \quad w^\wedge 15 \quad w^\wedge 20 \quad w^\wedge 25 \quad w^\wedge 30$$
$$1 \quad w^\wedge 6 \quad w^\wedge 12 \quad w^\wedge 18 \quad w^\wedge 24 \quad w^\wedge 30 \quad w^\wedge 36$$
$$];$$
$$[w = \exp(-j^*2^*pi/7)$$
[Equation 38]

Equation 38 may be extended to a 14-by-14 matrix through Equation 39.

$$\begin{bmatrix} P_{7\times 7} & P_{7\times 7} \\ P_{7\times 7} & -P_{7\times 7} \end{bmatrix}, \begin{bmatrix} P_{7\times 7} & -P_{7\times 7} \\ P_{7\times 7} & P_{7\times 7} \end{bmatrix},$$
$$\begin{bmatrix} -P_{7\times 7} & P_{7\times 7} \\ P_{7\times 7} & P_{7\times 7} \end{bmatrix}, \text{ or } \begin{bmatrix} P_{7\times 7} & P_{7\times 7} \\ -P_{7\times 7} & P_{7\times 7} \end{bmatrix}$$
[Equation 39]

Fourth Embodiment

According to the example, the number of LTF symbols (i.e., EHT LTF symbols) may be increased. In general, an LTF symbol may be determined based on the number of columns of a P matching matrix. For example, if a P mapping matrix of 16-by-16 is proposed in order to support a maximum of 16 streams, the number of LTF symbols may be 16. In this case, an overhead problem in which the number of LTF symbols is increased too much may occur. Accordingly, the following embodiment proposed a scheme for transmitting/receiving a reduced number of LTF symbols while supporting a maximum of 16 (or given N) streams.

The fourth embodiment may generate an LTF symbol based on two LTF generation sequences. For example, the LTF generation sequence (LTF_k) applied to the first to third embodiments may be represented as in the following equation.

LTF_k=[LTF sub1,LTF sub2, . . . ,LTF subK]    [Equation 40]

As already described in the example of FIG. 9, elements of the LTF generation sequence (LTF_k) may correspond to various frequency bands of 20, 40, 80, 80+80, 160, 240, 160+160, 320 MHz, etc. Each element of LTF_k may be mapped to a frequency band in various units (i.e., 312.5/N kHz), such as 78.125 kHz.

The LTF generation sequence (LTF_k) of Equation 40 may be defined in various manners. For example, a conventional HT/VHT/HE-LTF generation sequence may be used without any change. Furthermore, a value of a specific element (e.g., an even-numbered or odd-numbered element) may be set to 0.

The fourth embodiment proposes the following two sequences (e.g., a first LTF generation sequence and a second LTF generation sequence). The sequences of Equation 41 may be based on the sequence of Equation 40.

LTF symbol_odd=[LTF sub1,0,LTF sub2,0,LTF sub3, 0, . . . ]

LTF symbol_even=[0,LTF sub1,0,LTF sub2,0,LTF sub3, . . . ]   [Equation 41]

In Equation 41, an LTF symbol_odd may be indicated as a "first LTF generation sequence", and an LTF symbol_even may be indicated as a "second LTF generation sequence." The second LTF generation sequence may be configured in a way to shift an individual element of the first LTF generation sequence.

As indicated in Equation 41, an even-numbered element of the first LTF generation sequence may be set to zero (0), and an odd-numbered element of the second LTF generation sequence may be set to zero (0). Non-zero elements (i.e., LTF sub1, LTF sub2, LTF sub3) of the first LTF generation sequence may be the same as non-zero elements of the second LTF generation sequence. Furthermore, the length of the first LTF generation sequence may be the same as the length of the second LTF generation sequence.

In this specification, the first LTF generation sequence (LTF symbol_odd) may be used for an odd-numbered stream (i.e., 1, 3, 5, 7, . . . ), and the second LTF generation sequence (LTF symbol_even) may be used for an even-numbered stream (i.e., 2, 4, 6, 8, . . . ). For example, if a transmission STA uses four streams, a sequence may be used as in Equation 42 below.

For $1^{st}$ stream, LTF symbol_odd=[LTF sub1,0,LTF sub2,0,LTF sub3,0, . . . ]

For $2^{nd}$ stream, LTF symbol_even=[0,LTF sub1,0, LTF sub2,0,LTF sub3, . . . ]

For $3^{rd}$ stream, LTF symbol_odd=[LTF sub1,0,LTF sub2,0,LTF sub3,0, . . . ]

For $4^{th}$ stream, LTF symbol_even=[0,LTF sub1,0, LTF sub2,0,LTF sub3, . . . ]   [Equation 42]

Orthogonality is present between a first stream (i.e., LTF symbol_odd) and a second stream in Equation 42. Furthermore, orthogonality is present between a third stream (i.e., LTF symbol_odd) and a fourth stream. However, orthogonality is not present between the first stream and the third stream in Equation 42, and orthogonality is not present between the second stream and the fourth stream. Accordingly, this specification proposes a scheme for applying a P mapping matrix in order to maintain orthogonality between the first and third streams and orthogonality between the second and fourth streams.

The P mapping matrix for Equation 42 does not need to be 4-by-4, but only has to be 2-by-2. An example of the P mapping matrix for Equation 42 is as follows.

$$\begin{bmatrix} 1 & -1 \\ 1 & 1 \end{bmatrix} \text{ or } \begin{bmatrix} 1 & 1 \\ -1 & 1 \end{bmatrix} \text{ or } \begin{bmatrix} 1 & 1 \\ 1 & -1 \end{bmatrix} \quad \text{[Equation 43]}$$

That is, if a transmission STA applies the P mapping matrix of Equation 43 (e.g., the first P matrix of Equation 43) to the sequence of Equation 42, it may generate the following LTF symbol. The generated LTF symbol maintains orthogonality with respect to each stream.

That is, if the transmission STA applies the first P mapping matrix of Equation 43 to a first/third sequence of Equation 42 and applies the first P mapping matrix of Equation 43 to a second/fourth sequence of Equation 42 according to the method illustrated in FIG. 9, an LTF symbol, such as Equation 44, may be generated.

$$\begin{bmatrix} LTF \text{ symbol\_odd} & -LTF \text{ symbol\_odd} \\ LTF \text{ symbol\_even} & -LTF \text{ symbol\_even} \\ LTF \text{ symbol\_odd} & LTF \text{ symbol\_odd} \\ LTF \text{ symbol\_even} & LTF \text{ symbol\_even} \end{bmatrix} \quad \text{[Equation 44]}$$

Each column of Equation 44 corresponds to one individual LTF symbol. Each row of Equation 44 corresponds to one individual stream. That is, Equation 44 proposes two LTF symbols for each of four streams. That is, Equation 44 may propose an {LTF symbol_odd} symbol and an {−LTF symbol_odd} symbol for a first stream, may propose an {LTF symbol_even} symbol and an {−LTF symbol_even} symbol for a second stream, may propose an {LTF symbol_odd} symbol and an {LTF symbol_odd} symbol for a third stream, and may propose an {LTF symbol_even} symbol and an {LTF symbol_even} symbol for a fourth stream.

If an LTF symbol is generated using four streams according to a conventional technology, a total of four LTF symbols are generated, but an example of Equation 44 below has a technical advantage in that orthogonality for each stream is maintained through two LTF symbols.

However, an odd-numbered or even-numbered element of an LTF symbol_even or LTF symbol_odd included in the LTF symbol/signal of Equation 44 is configured as 0. Accordingly, when a reception STA performs channel estimation on the 0 element, there may be a problem in that interpolation or extrapolation in the reception STA is required. However, according to the aforementioned example, there is a technical advantage in that an orthogonal LTF symbol/signal is generated with respect to four streams through two LTF symbols.

The aforementioned example is represented differently as follows.

As described above, this specification proposes the first and second LTF generation sequences. An even-numbered element of the first LTF generation sequence may be set to zero (0), and an odd-numbered element of the second LTF generation sequence may be set to zero (0). The second generation sequence may be performed in a way to apply a bit shift to the first generation sequence. That is, non-zero elements (i.e., LTF sub1, LTF sub2, LTF sub3) of the first LTF generation sequence may be the same as non-zero elements of the second LTF generation sequence. The first generation sequence and the second generation sequence may be orthogonal to each other.

Furthermore, the first LTF generation sequence (LTF symbol_odd) may be used for an odd-numbered stream (i.e., 1, 3, 5, 7, . . . ), and the second LTF generation sequence (LTF symbol_even) may be used for an even-numbered stream (i.e., 2, 4, 6, 8, . . . ).

This specification proposes a P mapping matrix applied to the first and second LTF generation sequences in common. The P mapping matrix may include rows orthogonal to each other. The size of the P mapping matrix may be variously determined. For example, if the sum of streams used by a transmission/reception STA is N, the size of the P matrix according to this specification may be determined as (N/2)-by-(N/2). Furthermore, the size of the P matrix may be variously determined according to the following detailed example.

The transmission STA may apply a P mapping matrix to a first LTF generation sequence (LTF symbol_odd) in order to generate LTF symbols for an odd-numbered stream. For example, as in Equation 44, LTF symbols for first and third streams may be generated by applying a 2-by-2 matrix to the first LTF generation sequence.

Furthermore, the transmission STA may apply the same P mapping matrix to the second LTF generation sequence (LTF symbol_even) in order to generate LTF symbols for an even-numbered stream. For example, as in Equation 44, LTF symbols for the second and fourth streams may be generated by applying a 2-by-2 matrix to the second LTF generation sequence.

The above example may be represented below in another manner.

If the sum of streams used by a transmission/reception STA is N (N is an even number), the size of a P mapping matrix of this specification may be determined as (N/2)-by-(N/2). The transmission STA may apply a P mapping matrix to a first stream (i.e., LTF symbol_odd) in order to generate 1, 3, . . . (N−1)-th streams. Furthermore, the transmission STA may apply the P mapping matrix to a second stream (i.e., LTF symbol_even) in order to generate 2, 4, . . . N-th streams. Through the above operation, the transmission STA may generate LTF symbols for N streams, respectively. In this case, the number of LTF symbols for any one stream may be defined as N/2. If the sum of streams used by a transmission/reception STA is an odd-numbered (M), N=M+1 may be set, and the above operation may be repeated. That is, the size of a P mapping matrix of this specification may be determined as (N/2)-by-(N/2). That is, the size of the P mapping matrix may be determined as ((M+1)/2)-by-((M+1)/2). The transmission STA may apply a P mapping matrix to a first stream (i.e., LTF symbol_odd) in order to generate 1, 3, . . . , M-th streams. Furthermore, the transmission STA may apply the P mapping matrix to a second stream (i.e., LTF symbol_even) in order to generate 2, 4, . . . , (M−1)-th streams. In this case, the P mapping matrix applied to the second stream may be applied to only some (i.e., only from a first row to an (N/2−1)-th row) of the P mapping matrix, not the entire matrix.

A detailed example of the fourth embodiment may be expressed as follows.

Example: 2 Streams

A transmission STA does not need to apply a P mapping matrix. In this case, the transmission STA may generate one LTF symbol including a first stream (i.e., LTF symbol_odd) for the first stream, and may generate one LTF symbol including a second stream (i.e., LTF symbol_even) for the second stream. The transmission STA may transmit the one LTF symbol for the first stream and the one LTF symbol for the second stream at the same time.

Example: 3 Streams

As described above, if the sum of streams used by a transmission/reception STA is 3, a P mapping matrix may be defined as a 2-by-2 matrix. That is, as described above, the P mapping matrix used when the sum of streams is 3 may be the same as a P mapping matrix used when the sum of streams is 4.

For example, the P mapping matrix may be defined as in the following equation.

$$\begin{bmatrix} 1 & -1 \\ 1 & 1 \end{bmatrix} \text{ or } \begin{bmatrix} 1 & 1 \\ -1 & 1 \end{bmatrix} \text{ or } \begin{bmatrix} 1 & 1 \\ 1 & -1 \end{bmatrix} \quad \text{[Equation 45]}$$

As described above, the transmission STA may apply the P mapping matrix to a first stream (i.e., LTF symbol_odd) in order to generate LTF symbols for the first and third streams. Furthermore, the transmission STA may apply the P mapping matrix to a second stream (i.e., LTF symbol_even) in order to generate LTF symbols for the second stream. More specifically, the transmission STA may apply only some (e.g., only a first row) of the P mapping matrix to the second stream (i.e., LTF symbol_even) in order to generate the LTF symbol for the second stream.

As a result, the transmission STA may generate two LTF symbols for each of the first and third streams, and may generate two LTF symbols for each of the second streams. The transmission STA may transmit the two LTF symbols, individually generated for each of the first to third streams, for a time interval (e.g., 8 us) corresponding to the two symbols.

Example: 4 Streams

As described above, if the sum of streams used by a transmission/reception STA is 4, a P mapping matrix may be defined as a 2-by-2 matrix. For example, the P mapping matrix may be defined as in the following equation.

$$\begin{bmatrix} 1 & -1 \\ 1 & 1 \end{bmatrix} \text{ or } \begin{bmatrix} 1 & 1 \\ -1 & 1 \end{bmatrix} \text{ or } \begin{bmatrix} 1 & 1 \\ 1 & -1 \end{bmatrix} \quad \text{[Equation 46]}$$

As described above, the transmission STA may apply the P mapping matrix to a first stream (i.e., LTF symbol_odd) in order to generate LTF symbols for the first and third streams. Furthermore, the transmission STA may apply the P mapping matrix to a second stream (i.e., LTF symbol_even) in order to generate LTF symbols for second and fourth streams.

As a result, the transmission STA may generate two LTF symbols for each of the first and third streams, and may generate two LTF symbols for each of the second and fourth streams. The transmission STA may transmit the two LTF symbols, individually generated for each of the first to fourth streams, for a time interval (e.g., 8 us) corresponding to the two symbols.

Example: 5 Streams

As described above, if the sum of streams used by a transmission/reception STA is 5, a P mapping matrix may be defined as a 3-by-3 matrix. That is, as described above, the P mapping matrix used when the sum of streams is 5 may be the same as a P mapping matrix used when the sum of streams is 6.

For example, the P mapping matrix may be defined as in the following equation.

$$\begin{bmatrix} 1 & -1 & 1 \\ 1 & -w^1 & w^2 \\ 1 & -w^2 & w^4 \end{bmatrix} \quad \text{[Equation 47]}$$

$$w = \exp(-j^*2^*pi/3)$$

As described above, the transmission STA may apply the P mapping matrix to a first stream (i.e., LTF symbol_odd) in order to generate LTF symbols for a first, third, fifth stream. Furthermore, the transmission STA may apply the P mapping matrix to a second stream (i.e., LTF symbol_even) in order to generate LTF symbols for a second, fourth stream. More specifically, the transmission STA may apply only some (e.g., only first and second rows) of the P mapping matrix to the second stream (i.e., LTF symbol_even) in order to generate LTF symbols for the second and fourth streams.

As a result, the transmission STA may generate three LTF symbols for each of the first, third, and fifth streams, and may generate three LTF symbols for each of the second and fourth streams. The transmission STA may, transmit the three LTF symbols, individually generated for each of the first to fifth streams, for a time interval (e.g., 12 us) corresponding to the three symbols.

Additional Example: 5 Streams

If the sum of streams used by a transmission/reception STA is 5, a P mapping matrix may be defined as a 4-by-4 matrix.

For example, the P mapping matrix may be defined as the 4-by-4 matrix as in the following equation.

$$\begin{bmatrix} 1 & -1 & 1 & 1 \\ 1 & 1 & -1 & 1 \\ 1 & 1 & 1 & -1 \\ -1 & 1 & 1 & 1 \end{bmatrix} \quad \text{[Equation 48]}$$

The transmission STA may apply a P mapping matrix to a first stream (i.e., LTF symbol_odd) in order to generate LTF symbols for first, third, and fifth streams. More specifically, only some (e.g., only first to third rows) of the P mapping matrix may be applied. Furthermore, the transmission STA may apply the P mapping matrix to a second stream (i.e., LTF symbol_even) in order to generate LTF symbols for second and fourth streams. More specifically, only some (e.g., only first and second rows) of the P mapping matrix may be applied.

As a result, the transmission STA may generate four LTF symbols for each of the first, third, and fifth streams, and may generate four LTF symbols for each of the second and fourth streams. The transmission STA may transmit the four LTF symbols, individually generated for each of the first to fifth streams, for a time interval (e.g., 16 us) corresponding to the four symbols.

Example: 6 Streams

As described above, if the sum of streams used by a transmission/reception STA is 6, the P mapping matrix may be defined as a 3-by-3 matrix. For example, the P mapping matrix may be defined as in the following equation.

$$\begin{bmatrix} 1 & -1 & 1 \\ 1 & -w^1 & w^2 \\ 1 & -w^2 & w^4 \end{bmatrix} \quad \text{[Equation 49]}$$

$$w = \exp(-j^*2^*pi/3)$$

As described above, the transmission STA may apply the P mapping matrix to a first stream (i.e., LTF symbol_odd) in order to generate LTF symbols for first, third, and fifth streams. Furthermore, the transmission STA may apply the P mapping matrix to a second stream (i.e., LTF symbol_even) in order to generate LTF symbols for second, fourth, and sixth streams.

As a result, the transmission STA may generate three LTF symbols for each of the first, third, and fifth streams, and may generate three LTF symbols for each of the second, fourth, and sixth streams. The transmission STA may transmit the three LTF symbols, individually generated for each of the first to sixth streams, for a time interval (e.g., 12 us) corresponding to the three symbols.

Additional Example: 6 Streams

If the sum of streams used by a transmission/reception STA is 6, a P mapping matrix may be defined as a 4-by-4 matrix.

For example, the P mapping matrix may be defined as the 4-by-4 matrix as in the following equation.

$$\begin{bmatrix} 1 & -1 & 1 & 1 \\ 1 & 1 & -1 & 1 \\ 1 & 1 & 1 & -1 \\ -1 & 1 & 1 & 1 \end{bmatrix} \quad \text{[Equation 50]}$$

The transmission STA may apply the P mapping matrix to a first stream (i.e., LTF symbol_odd) in order to generate LTF symbols for first, third, and fifth streams. More specifically, only some (e.g., only first to third rows) of the P mapping matrix may be applied. Furthermore, the transmission STA may apply the P mapping matrix to a second stream (i.e., LTF symbol_even) in order to generate LTF symbols for second, fourth, and sixth streams. More specifically, only some (e.g., only first to third rows) of the P mapping matrix may be applied.

As a result, the transmission STA may generate four LTF symbols for each of the first, third, and fifth streams, and may generate four LTF symbols for each of the second, fourth, and sixth streams. The transmission STA may transmit the four LTF symbols, individually generated for each of the first to sixth streams, for a time interval (e.g., 16 us) corresponding to the four symbols.

Example: 7 Streams

As described above, when the sum of streams used by a transmission/reception STA is 7, a P mapping matrix may be defined as a 4-by-4 matrix. That is, as described above, the P mapping matrix used when the sum of streams is 7 may be the same as a P mapping matrix used when the sum of streams is 8.

For example, the P mapping matrix may be defined as in the following equation.

$$\begin{bmatrix} 1 & -1 & 1 & 1 \\ 1 & 1 & -1 & 1 \\ 1 & 1 & 1 & -1 \\ -1 & 1 & 1 & 1 \end{bmatrix} \quad [\text{Equation 51}]$$

As described above, the transmission STA may apply the P mapping matrix to a first stream (i.e., LTF symbol_odd) in order to generate LTF symbols for first, third, fifth, and seventh streams. Furthermore, the transmission STA may apply the P mapping matrix to a second stream (i.e., LTF symbol_even) in order to generate LTF symbols for second, fourth, and sixth streams. More specifically, only some (e.g., only first to third rows) of the P mapping matrix may be applied.

As a result, the transmission STA may generate four LTF symbols for each of the first, third, fifth, and seventh streams, and may generate four LTF symbols for each of the second, fourth, and sixth streams. The transmission STA may transmit the four LTF symbols, individually generated for each of the first to seventh streams, for a time interval (e.g., 16 us) corresponding to the four symbols.

Example: 8 Streams

As described above, when the sum of streams used by a transmission/reception STA is 8, a P mapping matrix may be defined as a 4-by-4 matrix. For example, the P mapping matrix may be defined as in the following equation.

For example, the P mapping matrix may be defined as in the following equation.

$$\begin{bmatrix} 1 & -1 & 1 & 1 \\ 1 & 1 & -1 & 1 \\ 1 & 1 & 1 & -1 \\ -1 & 1 & 1 & 1 \end{bmatrix} \quad \{\text{Equation 52}\}$$

As described above, the transmission STA may apply the P mapping matrix to a first stream (i.e., LTF symbol_odd) in order to generate LTF symbols for first, third, fifth, and seventh streams. Furthermore, the transmission STA may apply the P mapping matrix to a second stream (i.e., LTF symbol_even) in order to generate LTF symbols for second, fourth, sixth, and eighth streams.

As a result, the transmission STA may generate four LTF symbols for each of the first, third, fifth, and seventh streams, and may generate four LTF symbols for each of the second, fourth, sixth, and eighth streams. The transmission STA may transmit the four LTF symbols, individually generated for each of the first to eighth streams, for a time interval (e.g., 16 us) corresponding to the four symbols.

Example: 9 Streams

As described above, when the sum of streams used by a transmission/reception STA is 9, the P mapping matrix may be defined as a 5-by-5 matrix. That is, as described above, the P mapping matrix used when the sum of streams is 9 may be the same as a P mapping matrix used when the sum of streams is 10.

For example, the P mapping matrix may be defined as in the following equation.

$$\begin{bmatrix} 1 & 1 & 1 & 1 & 1 \\ 1 & w^1 & w^2 & w^3 & w^4 \\ 1 & w^2 & w^4 & w^6 & w^8 \\ 1 & w^3 & w^6 & w^9 & w^{12} \\ 1 & w^4 & w^8 & w^{12} & w^{16} \end{bmatrix} \quad [\text{Equation 53}]$$

$$w = \exp(-j^*2^*pi/5)$$

As described above, the transmission STA may apply the P mapping matrix to a first stream (i.e., LTF symbol_odd) in order to generate LTF symbols for first, third, fifth, seventh and ninth streams. Furthermore, the transmission STA may apply the P mapping matrix to a second stream (i.e., LTF symbol_even) in order to generate LTF symbols for second, fourth, sixth, and eighth streams. More specifically, only some (e.g., only first to fourth rows) of the P mapping matrix may be applied.

As a result, the transmission STA may generate five LTF symbols for each of the first, third, fifth, seventh and ninth streams, and may generate five LTF symbols for each of the second, fourth, sixth, and eighth streams. The transmission STA may transmit the five LTF symbols, individually generated for each of the first to ninth streams, for a time interval (e.g., 20 us) corresponding to the five symbols.

Additional Example: 9 Streams

When the sum of streams used by a transmission/reception STA is 9, a P mapping matrix may also be defined as a 6-by-6 matrix. For example, the P mapping matrix may be defined as a 6-by-6 matrix as in the following equation.

$$\begin{bmatrix} 1 & -1 & 1 & 1 & 1 & -1 \\ 1 & -w^1 & w^2 & w^3 & w^4 & -w^5 \\ 1 & -w^2 & w^4 & w^6 & w^8 & -w^{10} \\ 1 & -w^3 & w^6 & w^9 & w^{12} & -w^{15} \\ 1 & -w^4 & w^8 & w^{12} & w^{16} & -w^{20} \\ 1 & -w^5 & w^{10} & w^{15} & w^{20} & -w^{25} \end{bmatrix} \quad [\text{Equation 54}]$$

$$w = \exp(-j^*2^*pi/6)$$

The transmission STA may apply the P mapping matrix to a first stream (i.e., LTF symbol_odd) in order to generate LTF symbols for first, third, fifth, seventh and ninth streams. More specifically, only some (e.g., only first to fifth rows) of the P mapping matrix may be applied. Furthermore, the transmission STA may apply the P mapping matrix to a second stream (i.e., LTF symbol_even) in order to generate LTF symbols for second, fourth, sixth, and eighth streams. More specifically, only some (e.g., only first to fourth rows) of the P mapping matrix may be applied.

As a result, the transmission STA may generate six LTF symbols for each of the first, third, fifth, seventh and ninth streams, and may generate six LTF symbols for each of the second, fourth, sixth, and eighth streams. The transmission STA may transmit the six LTF symbols, individually generated for each of the first to ninth streams, for a time interval (e.g., 24 us) corresponding to the six symbols.

Example: 10 Streams

As described above, when the sum of streams used by a transmission/reception STA is 10, a P mapping matrix may be defined as a 5-by-5 matrix.

For example, the P mapping matrix may be defined as in the following equation.

$$\begin{bmatrix} 1 & 1 & 1 & 1 & 1 \\ 1 & w^{\wedge}1 & w^{\wedge}2 & w^{\wedge}3 & w^{\wedge}4 \\ 1 & w^{\wedge}2 & w^{\wedge}4 & w^{\wedge}6 & w^{\wedge}8 \\ 1 & w^{\wedge}3 & w^{\wedge}6 & w^{\wedge}9 & w^{\wedge}12 \\ 1 & w^{\wedge}4 & w^{\wedge}8 & w^{\wedge}12 & w^{\wedge}16 \end{bmatrix} \quad \text{[Equation 55]}$$

$$w = \exp(-j^*2^*pi/5)$$

As described above, the transmission STA may apply the P mapping matrix to a first stream (i.e., LTF symbol_odd) in order to generate LTF symbols for first, third, fifth, seventh and ninth streams. Furthermore, the transmission STA may apply the P mapping matrix to a second stream (i.e., LTF symbol_even) in order to generate LTF symbols for second, fourth, sixth, eighth and tenth streams.

As a result, the transmission STA may generate five LTF symbols for each of the first, third, fifth, seventh and ninth streams, and may generate five LTF symbols for each of the second, fourth, sixth, eighth and tenth streams. The transmission STA may transmit the five LTF symbols, individually generated for each of the first to tenth streams, for a time interval (e.g., 20 us) corresponding to the five symbols.

Additional Example: 10 Streams

When the sum of streams used by a transmission/reception STA is 10, a P mapping matrix may also be defined as a 6-by-6 matrix. For example, the P mapping matrix may be defined as a 6-by-6 matrix as in the following equation.

$$\begin{bmatrix} 1 & -1 & 1 & 1 & 1 & -1 \\ 1 & -w^{\wedge}1 & w^{\wedge}2 & w^{\wedge}3 & w^{\wedge}4 & -w^{\wedge}5 \\ 1 & -w^{\wedge}2 & w^{\wedge}4 & w^{\wedge}6 & w^{\wedge}8 & -w^{\wedge}10 \\ 1 & -w^{\wedge}3 & w^{\wedge}6 & w^{\wedge}9 & w^{\wedge}12 & -w^{\wedge}15 \\ 1 & -w^{\wedge}4 & w^{\wedge}8 & w^{\wedge}12 & w^{\wedge}16 & -w^{\wedge}20 \\ 1 & -w^{\wedge}5 & w^{\wedge}10 & w^{\wedge}15 & w^{\wedge}20 & -w^{\wedge}25 \end{bmatrix} \quad \text{[Equation 56]}$$

$$w = \exp(-j^*2^*pi/6)$$

The transmission STA may apply the P mapping matrix to a first stream (i.e., LTF symbol_odd) in order to generate LTF symbols for first, third, fifth, seventh and ninth streams. More specifically, only some (e.g., only first to fifth rows) of the P mapping matrix may be applied. Furthermore, the transmission STA may apply the P mapping matrix to a second stream (i.e., LTF symbol_even) in order to generate LTF symbols for second, fourth, sixth, eighth and tenth streams. More specifically, only some (e.g., only first to fifth rows) of the P mapping matrix may be applied.

As a result, the transmission STA may generate six LTF symbols for each of the first, third, fifth, seventh and ninth streams, and may generate six LTF symbols for each of the second, fourth, sixth, eighth and tenth streams. The transmission STA may transmit the six LTF symbols, individually generated for each of the first to tenth streams, for a time interval (e.g., 24 us) corresponding to the six symbols.

Example: 11 Streams

As described above, when the sum of streams used by a transmission/reception STA is 11, a P mapping matrix may be defined as a 6-by-6 matrix. That is, as described above, the P mapping matrix used when the sum of streams is 11 may be the same as a P mapping matrix used when the sum of streams is 12.

For example, the P mapping matrix may be defined as in the following equation.

$$\begin{bmatrix} 1 & -1 & 1 & 1 & 1 & -1 \\ 1 & -w^{\wedge}1 & w^{\wedge}2 & w^{\wedge}3 & w^{\wedge}4 & -w^{\wedge}5 \\ 1 & -w^{\wedge}2 & w^{\wedge}4 & w^{\wedge}6 & w^{\wedge}8 & -w^{\wedge}10 \\ 1 & -w^{\wedge}3 & w^{\wedge}6 & w^{\wedge}9 & w^{\wedge}12 & -w^{\wedge}15 \\ 1 & -w^{\wedge}4 & w^{\wedge}8 & w^{\wedge}12 & w^{\wedge}16 & -w^{\wedge}20 \\ 1 & -w^{\wedge}5 & w^{\wedge}10 & w^{\wedge}15 & w^{\wedge}20 & -w^{\wedge}25 \end{bmatrix} \quad \text{[Equation 57]}$$

$$w = \exp(-j^*2^*pi/6)$$

As described above, the transmission STA may apply the P mapping matrix to a first stream (i.e., LTF symbol_odd) in order to generate LTF symbols for first, third, fifth, seventh, ninth, and eleventh streams. Furthermore, the transmission STA may apply the P mapping matrix to a second stream (i.e., LTF symbol_even) in order to generate LTF symbols for second, fourth, sixth, eighth and tenth streams. More specifically, only some (e.g., only first to fifth rows) of the P mapping matrix may be applied.

As a result, the transmission STA may generate six LTF symbols for each of the first, third, fifth, seventh, ninth, and eleventh streams, and may generate six LTF symbols for each of the second, fourth, sixth, eighth and tenth streams. The transmission STA may transmit the six LTF symbols, individually generated for each of the first to eleventh streams, for a time interval (e.g., 24 us) corresponding to the six symbols.

Example: 12 Streams

As described above, when the sum of streams used by a transmission/reception STA is 12, a P mapping matrix may be defined as a 6-by-6 matrix.

For example, the P mapping matrix may be defined as in the following equation.

$$\begin{bmatrix} 1 & -1 & 1 & 1 & 1 & -1 \\ 1 & -w^{\wedge}1 & w^{\wedge}2 & w^{\wedge}3 & w^{\wedge}4 & -w^{\wedge}5 \\ 1 & -w^{\wedge}2 & w^{\wedge}4 & w^{\wedge}6 & w^{\wedge}8 & -w^{\wedge}10 \\ 1 & -w^{\wedge}3 & w^{\wedge}6 & w^{\wedge}9 & w^{\wedge}12 & -w^{\wedge}15 \\ 1 & -w^{\wedge}4 & w^{\wedge}8 & w^{\wedge}12 & w^{\wedge}16 & -w^{\wedge}20 \\ 1 & -w^{\wedge}5 & w^{\wedge}10 & w^{\wedge}15 & w^{\wedge}20 & -w^{\wedge}25 \end{bmatrix} \quad \text{[Equation 58]}$$

$$w = \exp(-j^*2^*pi/6)$$

As described above, the transmission STA may apply the P mapping matrix to a first stream (i.e., LTF symbol_odd) in order to generate LTF symbols for first, third, fifth, seventh, ninth, and eleventh streams. Furthermore, the transmission STA may apply the P mapping matrix to a second stream (i.e., LTF symbol_even) in order to generate LTF symbols for second, fourth, sixth, eighth, tenth, and twelfth streams.

As a result, the transmission STA may generate six LTF symbols for each of the first, third, fifth, seventh, ninth, and eleventh streams, and may generate six LTF symbols for each of the second, fourth, sixth, eighth, tenth, and twelfth streams. The transmission STA may transmit the six LTF symbols, individually generated for each of the first to twelfth streams, for a time interval (e.g., 24 us) corresponding to the six symbols.

Example: 13 Streams

As described above, when the sum of streams used by a transmission/reception STA is 13, a P mapping matrix may be defined as a 7-by-7 matrix. That is, as described above, the P mapping matrix used when the sum of streams is 13 may be the same as a P mapping matrix used when the sum of streams is 14.

For example, the P mapping matrix may be defined as in the following equation.

$$\begin{bmatrix} 1 & 1 & 1 & 1 & 1 & 1 & 1 \\ 1 & w^{\wedge}1 & w^{\wedge}2 & w^{\wedge}3 & w^{\wedge}4 & w^{\wedge}5 & w^{\wedge}6 \\ 1 & w^{\wedge}2 & w^{\wedge}4 & w^{\wedge}6 & w^{\wedge}8 & w^{\wedge}10 & w^{\wedge}12 \\ 1 & w^{\wedge}3 & w^{\wedge}6 & w^{\wedge}9 & w^{\wedge}12 & w^{\wedge}15 & w^{\wedge}18 \\ 1 & w^{\wedge}4 & w^{\wedge}8 & w^{\wedge}12 & w^{\wedge}16 & w^{\wedge}20 & w^{\wedge}24 \\ 1 & w^{\wedge}5 & w^{\wedge}10 & w^{\wedge}15 & w^{\wedge}20 & w^{\wedge}25 & w^{\wedge}30 \\ 1 & w^{\wedge}6 & w^{\wedge}12 & w^{\wedge}18 & w^{\wedge}24 & w^{\wedge}30 & w^{\wedge}36 \end{bmatrix} \quad \text{[Equation 59]}$$

$w = \exp(-j^*2^*pi/7)$

As described above, the transmission STA may apply the P mapping matrix to a first stream (i.e., LTF symbol_odd) in order to generate LTF symbols for first, third, fifth, seventh, ninth, eleventh, and thirteenth streams. Furthermore, the transmission STA may apply the P mapping matrix to a second stream (i.e., LTF symbol_even) in order to generate LTF symbols for second, fourth, sixth, eighth, tenth, and twelfth streams. More specifically, only some (e.g., only first to sixth rows) of the P mapping matrix may be applied.

As a result, the transmission STA may generate seven LTF symbols for each of the first, third, fifth, seventh, ninth, eleventh, and thirteenth streams, and may generate seven LTF symbols for each of the second, fourth, sixth, eighth, tenth, and twelfth streams. The transmission STA may transmit the seven LTF symbols, individually generated for each of the first to thirteenth streams, for a time interval (e.g., 28 us) corresponding to the seven symbols.

Additional Example: 13 Streams

When the sum of streams used by a transmission/reception STA is 13, a P mapping matrix may also be defined as an 8-by-8 matrix. For example, the example of the 8-by-8 matrix may be any one of the examples of the 8-by-8 matrix illustrated in Equation 24, Equation 26, Equation 27, Equation 28, and Equation 29.

The transmission STA may apply the P mapping matrix to a first stream (i.e., LTF symbol_odd) in order to generate LTF symbols for first, third, fifth, seventh, ninth, eleventh, and thirteenth streams. More specifically, only some (e.g., only first to seventh rows) of the P mapping matrix may be applied. Furthermore, the transmission STA may apply the P mapping matrix to a second stream (i.e., LTF symbol_even) in order to generate LTF symbols for second, fourth, sixth, eighth, tenth, and twelfth streams. More specifically, only some (e.g., only first to sixth rows) of the P mapping matrix may be applied.

As a result, the transmission STA may generate eight LTF symbols for each of the first, third, fifth, seventh, ninth, eleventh, and thirteenth streams, and may generate eight LTF symbols for each of the second, fourth, sixth, eighth, tenth, and twelfth streams. The transmission STA may transmit the eight LTF symbols, individually generated for each of the first to thirteenth streams, for a time interval (e.g., 32 us) corresponding to the eighth symbols.

Example: 14 Streams

As described above, when the sum of streams used by a transmission/reception STA is 14, a P mapping matrix may be defined as a 7-by-7 matrix.

For example, the P mapping matrix may be defined as in the following equation.

$$\begin{bmatrix} 1 & 1 & 1 & 1 & 1 & 1 & 1 \\ 1 & w^{\wedge}1 & w^{\wedge}2 & w^{\wedge}3 & w^{\wedge}4 & w^{\wedge}5 & w^{\wedge}6 \\ 1 & w^{\wedge}2 & w^{\wedge}4 & w^{\wedge}6 & w^{\wedge}8 & w^{\wedge}10 & w^{\wedge}12 \\ 1 & w^{\wedge}3 & w^{\wedge}6 & w^{\wedge}9 & w^{\wedge}12 & w^{\wedge}15 & w^{\wedge}18 \\ 1 & w^{\wedge}4 & w^{\wedge}8 & w^{\wedge}12 & w^{\wedge}16 & w^{\wedge}20 & w^{\wedge}24 \\ 1 & w^{\wedge}5 & w^{\wedge}10 & w^{\wedge}15 & w^{\wedge}20 & w^{\wedge}25 & w^{\wedge}30 \\ 1 & w^{\wedge}6 & w^{\wedge}12 & w^{\wedge}18 & w^{\wedge}24 & w^{\wedge}30 & w^{\wedge}36 \end{bmatrix} \quad \text{[Equation 60]}$$

$w = \exp(-j^*2^*pi/7)$

As described above, the transmission STA may apply the P mapping matrix to a first stream (i.e., LTF symbol_odd) in order to generate LTF symbols for first, third, fifth, seventh, ninth, eleventh, and thirteenth streams. Furthermore, the transmission STA may apply the P mapping matrix to a second stream (i.e., LTF symbol_even) in order to generate LTF symbols for second, fourth, sixth, eighth, tenth, twelfth, and fourteenth streams.

As a result, the transmission STA may generate seven LTF symbols for each of the first, third, fifth, seventh, ninth, eleventh, and thirteenth streams, and may generate seven LTF symbols for each of the second, fourth, sixth, eighth, tenth, twelfth, and fourteenth streams. The transmission STA may transmit the seven LTF symbols, individually generated for each of the first to fourteenth streams, for a time interval (e.g., 28 us) corresponding to the seven symbols.

Additional Example: 14 Streams

When the sum of streams used by a transmission/reception STA is 14, a P mapping matrix may also be defined as an 8-by-8 matrix. For example, the example of the 8-by-8 matrix may be any one of the examples of the 8-by-8 matrix illustrated in Equation 24, Equation 26, Equation 27, Equation 28, and Equation 29.

The transmission STA may apply the P mapping matrix to a first stream (i.e., LTF symbol_odd) in order to generate LTF symbols for first, third, fifth, seventh, ninth, eleventh, and thirteenth streams. More specifically, only some (e.g., only first to seventh rows) of the P mapping matrix may be applied. Furthermore, the transmission STA may apply the P mapping matrix to a second stream (i.e., LTF symbol_even) in order to generate LTF symbols for second, fourth, sixth, eighth, tenth, twelfth, and fourteenth streams. More specifically, only some (e.g., only first to seventh rows) of the P mapping matrix may be applied.

As a result, the transmission STA may generate eight LTF symbols for each of the first, third, fifth, seventh, ninth, eleventh, and thirteenth streams, and may generate eight LTF symbols for each of the second, fourth, sixth, eighth, tenth, twelfth, and fourteenth streams. The transmission STA may transmit the eight LTF symbols, individually generated for each of the first to fourteenth streams, for a time interval (e.g., 32 us) corresponding to the eighth symbols.

Example: 15 Streams

When the sum of streams used by a transmission/reception STA is 15, a P mapping matrix may be defined as an 8-by-8 matrix. For example, the example of the 8-by-8 matrix may be any one of the examples of the 8-by-8 matrix illustrated in Equation 24, Equation 26, Equation 27, Equation 28, and Equation 29.

The transmission STA may apply the P mapping matrix to a first stream (i.e., LTF symbol_odd) in order to generate LTF symbols for first, third, fifth, seventh, eleventh, thirteenth, and fifteenth streams. Furthermore, the transmission STA may apply the P mapping matrix to a second stream (i.e., LTF symbol_even) in order to generate LTF symbols for second, fourth, sixth, eighth, tenth, twelfth, and fourteenth streams. More specifically, only some (e.g., only first to seventh rows) of the P mapping matrix may be applied.

As a result, the transmission STA may generate eight LTF symbols for each of the first, third, fifth, seventh, eleventh, thirteenth, and fifteenth streams, and may generate eight LTF symbols for each of the second, fourth, sixth, eighth, tenth, twelfth, and fourteenth streams. The transmission STA may transmit the eight LTF symbols, individually generated for each of the first to fifteenth streams, for a time interval (e.g., 32 us) corresponding to the eighth symbols.

Example: 16 Streams

When the sum of streams used by a transmission/reception STA is 16, a P mapping matrix may be defined as an 8-by-8 matrix. For example, the example of the 8-by-8 matrix may be any one of the example of the 8-by-8 matrix illustrated in Equation 24, Equation 26, Equation 27, Equation 28, and Equation 29.

The transmission STA may apply the P mapping matrix to a first stream (i.e., LTF symbol_odd) in order to generate LTF symbols for first, third, fifth, seventh, eleventh, thirteenth, and fifteenth streams. Furthermore, the transmission STA may apply the P mapping matrix to a second stream (i.e., LTF symbol_even) in order to generate LTF symbols for second, fourth, sixth, eighth, tenth, twelfth, fourteenth, and sixteenth streams.

As a result, the transmission STA may generate eight LTF symbols for each of the first, third, fifth, seventh, eleventh, thirteenth, and fifteenth streams, and may generate eight LTF symbols for each of the second, fourth, sixth, eighth, tenth, twelfth, fourteenth, and sixteenth streams. The transmission STA may transmit the eight LTF symbols, individually generated for each of the first to sixteenth streams, for a time interval (e.g., 32 us) corresponding to the eighth symbols.

The example of the P matrix may be additionally modified. For example, a symbol in a specific column of the P matrix disclosed in the equations described in the fourth embodiment and other embodiments (i.e., the first/second/third embodiments) may be variously modified. Specifically, the same sign (i.e., "+" or "−" sign) may be applied to any one column of a specific P matrix, and the "+" sign or "−" sign may be freely selected with respect to each column of the corresponding P matrix.

Figure 10:
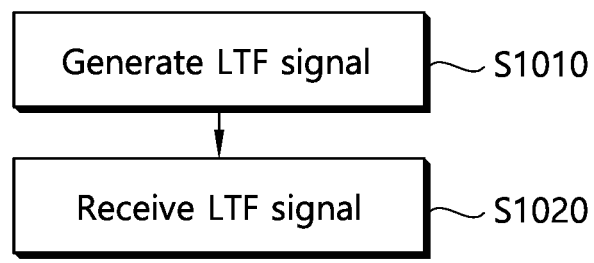
FIG. 10 illustrates an example in which an operation according to an example of this specification is performed.

FIG. 10 illustrates an example in which an operation according to an example of this specification is performed.

As illustrated in S1010, a transmission STA generates an LTF signal. The LTF signal includes at least one LTF symbol. The LTF symbol may be generated based on the various P mapping matrices described in the embodiment 1 to the embodiment 4. Furthermore, the LTF symbol may be generated based on the various LTF generation sequences described in the embodiment 1 to the embodiment 4.

For example, the transmission STA may generate at least one LTF symbol by applying any one of the P mapping matrices, described in the first to fourth embodiments, to any one LTF generation sequence described in the first to fourth embodiments. The number of generated LTF symbols or the number of streams used for the LTF symbols is determined based on the detailed examples described in the first to fourth embodiments.

Step S1010 may be implemented through the apparatus illustrated in FIG. 7. That is, by the apparatus illustrated in FIG. 7, an operation of applying a P mapping matrix to an LTF signal and then applying a CSD and a Q matrix is possible.

As illustrated in S1020, the transmission STA transmits the generated LTF signal to a reception STA. The LTF signal may be included in a physical protocol data unit (PPDU) separately described below.

Figure 11:
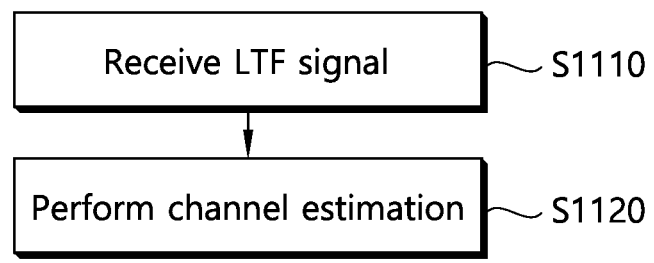
FIG. 11 illustrates another example in which an operation according to an example of this specification is performed.

FIG. 11 illustrates another example in which an operation according to an example of this specification is performed.

As illustrated in S1110, a reception STA may receive an LTF signal. The received LTF signal may be generated based on the various P mapping matrices and LTF generation sequences described in the embodiment 1 to the embodiment 4.

As illustrated in S1120, the reception STA performs channel estimation based on the received LTF signal. As described in Equation 3 to Equation 5, if a P mapping matrix and an LTF generation sequence are known to a reception STA, the reception STA may perform channel estimation on an MIMO channel through which an LTF signal is received through various algorithms evident to those skilled in the art. That is, sequences included in the LTF symbol maintain orthogonality with respect to each stream. Accordingly, the reception STA may perform estimation on the MIMO channel based on such orthogonality.

FIG. 12 is an example of a PPDU structure including an LTF signal of this specification.

The aforementioned LTF signal/symbol may be transmitted/received based on the PPDU of FIG. 12.

Some or all of illustrated parts (i.e., fields) may be divided into a plurality of subparts/subfields. Each of the fields (and subfields thereof) may be transmitted in a 4 us*N (N is integer) unit. Furthermore, each field may include a guard interval (or short GI) of a conventional WIFI standard. A common subcarrier frequency spacing value (delta_f=312.5 kHz/N or 312.5 kHz*N, N=integer) may be applied to all of the illustrated fields or a first delta_f may be applied to a first part (e.g., all of Legacy-Parts, some/all of SIG-Parts), and a second delta_f (e.g., a value smaller than the first delta_f) may be applied to some/all of the remaining parts.

Some of the illustrated fields may be omitted, and the sequence of the fields has been illustrated and thus may be changed in various manners. For example, a subfield (e.g., EHT-SIG-A and/or HARQ-SIG) of an EHT SIG Part 1220 may be positioned ahead of an EHT STF Part 1230, and the remaining subfield (e.g., EHT-SIG-B/C or HARQ-SIG) of the EHT SIG Part 1220 may be positioned behind the EHT STF Part 1230.

A Legacy Part 1210 of FIG. 12 may include at least one of a Non-HT Short Training Field (L-STF), a Non-HT Long Training Field (L-LTF), and a Non-HT Signal Field (L-SIG). Furthermore, the EHT SIG Part 1220 of FIG. 12 may include various types of control information for a transmitted PPDU. For example, the EHT SIG Part 1220 may include control information for the decoding of the EHT STF Part 1230, an EHT LTF Part 1240, and Data 1250.

Specifically, the EHT SIG Part 1220 may include information on an LTF signal/symbol included in the EHT LTF Part 1240. For example, if an LTF generation sequence is divided into various types, the EHT SIG Part 1220 may include information to identify the LTF generation sequence. Furthermore, the EHT SIG Part 1220 may include information related to the number of symbols (OFDM symbol) of an LTF signal. Furthermore, the EHT SIG Part 1220 may include information to identify a stream applied to an LTF signal.

The EHT STF 1230 may include an EHT STF signal. The EHT-STF signal may be used to improve automatic gain control estimation in a multiple input multiple output (MIMO) environment or an OFDMA environment.

An LTF signal/symbol generated through the first to fourth embodiments may be included in the EHT LTF 1240. A transmission time of the EHT LTF may be variably determined by the number of LTF symbols included in the EHT LTF 1240.

The data field 1250 may include a MAC PDU or an aggregate MPDU.

Figure 13:
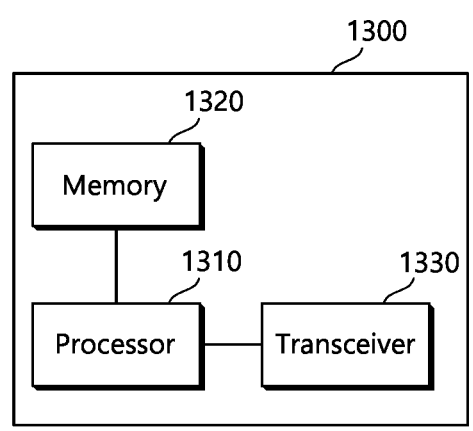
FIG. 13 illustrates a transmission STA or a reception STA to which an example of this specification is applied.

FIG. 13 illustrates a transmission STA or a reception STA to which an example of this specification is applied.

Referring to FIG. 13, the STA 1300 may include a processor 1310, a memory 1320, and a transceiver 1330. Characteristics of FIG. 13 may be applied a non-AP STA or an AP STA. Each of the illustrated processor, memory and transceiver may be implemented as a separate chip or may have at least two blocks/functions implemented through one chip.

The illustrated transceiver 1330 performs an operation of transmitting and receiving signals. Specifically, the transceiver 1330 may transmit or receive an IEEE 802.11 packet (e.g., IEEE 802.11a/b/g/n/ac/ax/be, etc.).

The processor 1310 may implement the functions, processes and/or methods proposed in this specification. Specifically, the processor 1310 may receive a signal through the transceiver 1330, may process the received signal, may generate a transmission signal, and may perform control for signal transmission.

The processor 1310 may include application-specific integrated circuits (ASIC), other chipsets, logic circuits, and data processors. The memory 1320 may include a read-only memory (ROM), a random access memory (RAM), a flash memory, a memory card, a storage medium and/or other storages.

The memory 1320 may store a signal (i.e., received signal) received through the transceiver, and may store a signal (i.e., transmission signal) to be transmitted through the transceiver. That is, the processor 1310 may obtain the received signal through the memory 1320, and may store a signal to be transmitted in the memory 1320.

Figure 14:
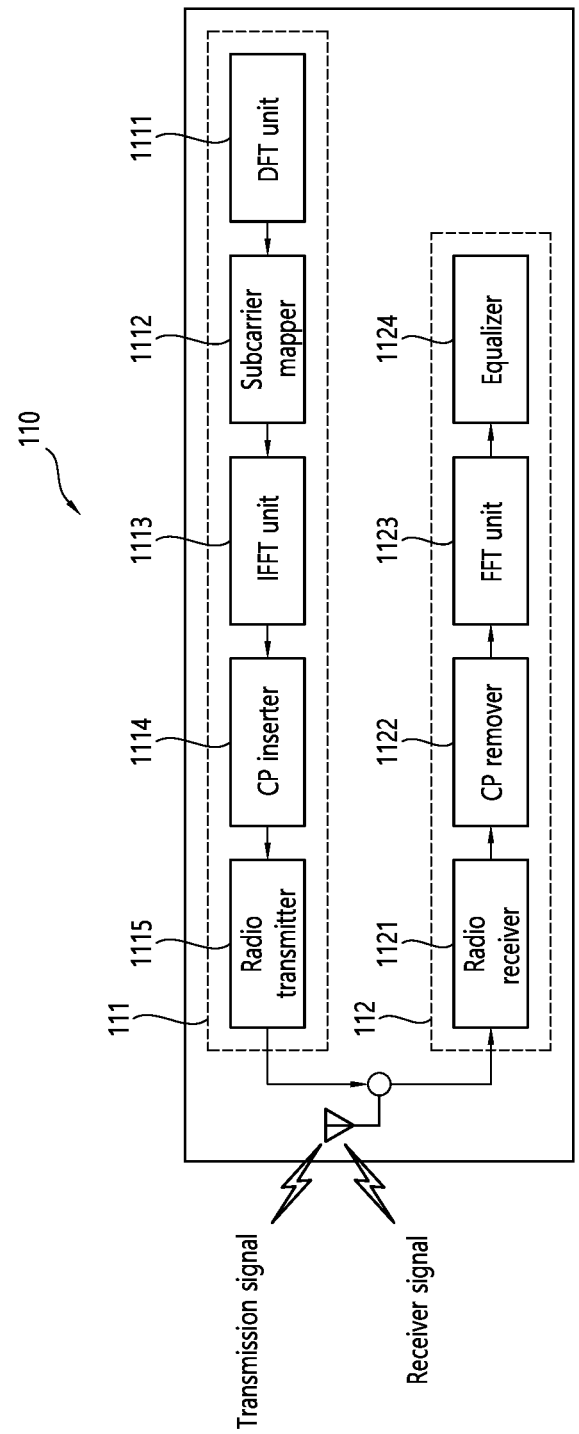
FIG. 14 illustrates another example of a detailed block diagram of a transceiver.

FIG. 14 illustrates another example of a detailed block diagram of a transceiver. Some or all of blocks of FIG. 14 may be included in the processor 1310. Referring to FIG. 14, the transceiver 110 includes a transmission part 111 and a reception part 112. The transmission part 111 includes a discrete Fourier transform (DFT) unit 1111, a subcarrier mapper 1112, an IFFT unit 1113, a CP inserter 1114, and a radio transmitter 1115. The transmission part 111 may further include a modulator. Furthermore, for example, the transmission part 111 may further include a scramble unit (not illustrated), modulation mapper (not illustrated), a layer mapper (not illustrated) and a layer permutator (not illustrated), all of which may be disposed in front of the DFT unit 1111. That is, in order to prevent an increase in the peak-to-average power ratio (PAPR), in the transmission part 111, information experiences the DFT 1111 before a signal is mapped to a subcarrier. After subcarrier mapping is performed on a signal spread (or precoded as the same meaning) by the DFT unit 1111 through the subcarrier mapper 1112, the signal experiences the IFFT unit 1113 to produce a signal on a time axis.

The DFT unit 1111 outputs complex-valued symbols by performing a DFT on input symbols. For example, when Ntx symbols are input (wherein Ntx is a natural number), a DFT size is Ntx. The DFT unit 1111 is called a transform precoder. The subcarrier mapper 1112 maps the complex-valued symbols onto each subcarrier in a frequency region. The complex-valued symbols may be mapped onto resource elements corresponding to a resource block allocated for data transmission. The subcarrier mapper 1112 is called a resource element mapper. The IFFT unit 1113 outputs a baseband signal for data, that is, a time region signal, by performing an IFFT on an input symbol. The CP inserter 1114 duplicates some of the rear portion of the baseband signal for data and inserts the duplicated portion into the front portion of the baseband signal for data. Orthogonality can be maintained even in a multi-path channel because inter-symbol interference (ISI) or inter-carrier interference (ICI) is prevented through CP insertion.

Meanwhile, the reception part 112 includes a radio receiver 1121, a CP remover 1122, an FFT unit 1123, and an equalizer 1124. The radio receiver 1121, CP remover 1122, and FFT unit 1123 of the reception part 112 perform functions opposite the functions of the radio transmitter 1115, CP inserter 1114, and IFFT unit 1113 of the transmission part 111. The reception part 112 may further include a demodulator.

The transceiver of FIG. 14 may include a reception window controller (not illustrated) for extracting some of a received signal in addition to the illustrated blocks, and may include a decoding operation processor (not illustrated) for performing a decoding operation on a signal extracted through a reception window.

The aforementioned technical characteristics of this specification may be applied to various applications or business models. For example, the technical characteristics may be applied for wireless communication in an apparatus that support artificial intelligence (AI).

AI means artificial intelligence and a field in which a methodology capable of producing AI is researched. Machine learning means a field in which a methodology for defining various problems handled in the AI field and solving the problems is researched. Machine learning is also defined as an algorithm for improving performance a task through continued experiences for the task.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyperparameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

What is claimed is:

1. A method in a wireless local area network (WLAN) system, comprising:
   generating an extremely high throughput (EHT) signal (SIG) field;
   generating an EHT short training field (STF),
   wherein the EHT STF is generated based on an EHT STF sequence, and the EHT STF is contiguous to the EHT SIG field;
   generating an EHT long training field (LTF) including a plurality of LTF symbols used for a plurality of streams comprising first to third streams,
   wherein the EHT LTF is contiguous to the EHT STF, and the EHT SIG field includes information related to a number of the plurality of LTF symbols,
   wherein each of the plurality of LTF symbols is generated based on a first LTF generation sequence used for an odd-numbered stream and a second LTF generation sequence used for an even-numbered stream, an even-numbered element of the first LTF generation sequence is set to zero (0) and an odd-numbered element of the second LTF generation sequence is set to zero (0), the plurality of LTF symbols used for the first and third streams is generated by applying a P mapping matrix to the first LTF generation sequence, and the plurality of LTF symbols used for the second stream is generated by applying the P matrix to the second LTF generation sequence; and
   transmitting a physical protocol data unit (PPDU) comprising the EHT SIG field, the EHT STF, and the EHT LTF.

2. The method of claim 1, wherein a sum of the plurality of streams is 3 or 4, the P mapping matrix is defined as a 2 by 2 matrix, a number of the plurality of LTF symbols is 2, and rows of the P mapping matrix are orthogonal to each other.

3. The method of claim 1, wherein non-zero elements of the first LTF generation sequence are identical with non-zero elements of the second LTF generation sequence.

4. The method of claim 1, wherein:
   the first LTF generation sequence is indicated as LTF symbol_odd, and the second LTF generation sequence is indicated as LTF symbol_even,
   the LTF symbol_odd is defined as follows, wherein LTF symbol_odd={LTF sub1, 0, LTF sub2, 0, LTF sub3, 0, . . . , LTF sub m, 0},
   the LTF symbol_even is defined as follows, wherein LTF symbol_even={0, LTF sub1, 0, LTF sub2, 0, LTF sub3, 0, . . . , LTF sub m}, and
   each of the LTF sub1 to the LTF sub m indicates an element of the LTF generation sequence.

5. A station (STA) of a wireless local area network (WLAN) system, comprising:
   a memory storing a transmission and a received signal; and
   a processor coupled to the memory,
   wherein the processor is configured to:
   generate an extremely high throughput (EHT) signal (SIG) field;
   generate an EHT short training field (STF),
   wherein the EHT STF is generated based on an EHT STF sequence, and the EHT STF is contiguous to the EHT SIG field;
   generate an EHT long training field (LTF) including a plurality of LTF symbols used for a plurality of streams comprising first to third streams,
   wherein the EHT LTF is contiguous to the EHT STF, and the EHT SIG field includes information related to a number of the plurality of LTF symbols,
   wherein each of the plurality of LTF symbols is generated based on a first LTF generation sequence used for an odd-numbered stream and a second LTF generation sequence used for an even-numbered stream, an even-numbered element of the first LTF generation sequence is set to zero (0) and an odd-numbered element of the second LTF generation sequence is set to zero (0), the plurality of LTF symbols used for the first and third streams is generated by applying a P mapping matrix to the first LTF generation sequence, and the plurality of LTF symbols used for the second stream is generated by applying the P matrix to the second LTF generation sequence, configure a physical protocol data unit (PPDU) comprising the EHT SIG field, the EHT STF, and the EHT LTF, and store the configured PPDU in the memory.

6. The STA of claim 5, wherein a sum of the plurality of streams is 3 or 4, the P mapping matrix is defined as a 2 by 2 matrix, a number of the plurality of LTF symbols is 2, and rows of the P mapping matrix are orthogonal to each other.

7. The STA of claim 5, wherein non-zero elements of the first LTF generation sequence are identical with non-zero elements of the second LTF generation sequence.

8. The STA of claim 5, wherein:
the first LTF generation sequence is indicated as LTF symbol_odd, and the second LTF generation sequence is indicated as LTF symbol_even,
the LTF symbol_odd is defined as follows, wherein LTF symbol_odd={LTF sub1, 0, LTF sub2, 0, LTF sub3, 0, . . . , LTF sub m, 0},
the LTF symbol_even is defined as follows, wherein LTF symbol_even={0, LTF sub1, 0, LTF sub2, 0, LTF sub3, 0, . . . , LTF sub m}, and
each of the LTF sub1 to the LTF sub m indicates an element of the LTF generation sequence.

* * * * *